(12) United States Patent
Konno et al.

(10) Patent No.: US 9,351,108 B2
(45) Date of Patent: May 24, 2016

(54) INFORMATION PROCESSING SYSTEM, INFORMATION PROCESSING TERMINAL, INFORMATION PROCESSING METHOD, PROGRAM, AND INFORMATION STORAGE MEDIUM

(71) Applicant: Sony Computer Entertainment Inc., Tokyo (JP)

(72) Inventors: Shohei Konno, Tokyo (JP); Tomohiro Hasekura, Tokyo (JP); Eiichi Nishina, Tokyo (JP); Kenji Kaido, Kanagawa (JP); Hiroshi Tamate, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/375,292

(22) PCT Filed: Dec. 27, 2012

(86) PCT No.: PCT/JP2012/083893
§ 371 (c)(1),
(2) Date: Jul. 29, 2014

(87) PCT Pub. No.: WO2013/118420
PCT Pub. Date: Aug. 15, 2013

(65) Prior Publication Data
US 2015/0024783 A1    Jan. 22, 2015

(30) Foreign Application Priority Data

Feb. 7, 2012   (JP) ................................. 2012-024568

(51) Int. Cl.
*H04W 24/00* (2009.01)
*H04W 4/02* (2009.01)
*G06F 17/30* (2006.01)
*A63F 13/30* (2014.01)
(Continued)

(52) U.S. Cl.
CPC ............... *H04W 4/02* (2013.01); *A63F 13/216* (2014.09); *A63F 13/30* (2014.09); *A63F 13/795* (2014.09); *G06F 17/3087* (2013.01); *A63F 13/798* (2014.09); *A63F 13/92* (2014.09)

(58) Field of Classification Search
CPC ....... H04W 4/02; H04W 64/00; H04W 4/021; H04W 4/023; H04W 4/025; H04W 64/003; H04W 4/20; H04L 67/18; H04L 67/22; H04L 67/24; H04L 67/16; H04L 67/306; H04L 12/2818; H04M 2242/30; H04M 2242/04; H04M 1/72519; H04M 2201/38; H04M 2203/2044; H04M 2207/18; H04M 1/72572; A63F 13/216; A63F 13/30; A63F 13/795; G06F 17/3087
USPC ........................... 455/414.1, 456.1–457, 566
See application file for complete search history.

(56) References Cited

U.S. PATENT DOCUMENTS

| 8,983,777 B2 | 3/2015 | Kaido |
| 2013/0103310 A1 | 4/2013 | Kaido |

FOREIGN PATENT DOCUMENTS

| EP | 2590133 A1 | 5/2013 |

(Continued)

OTHER PUBLICATIONS

International Preliminary Report on Patentability for corresponding PCT Application No. PCT/2012/083893, dated Aug. 21, 2014.

(Continued)

*Primary Examiner* — Olumide T Ajibade Akonai
(74) *Attorney, Agent, or Firm* — Matthew B. Dernier, Esq.

(57) ABSTRACT

The present invention is to facilitate finding of a user expected to have a high relevance among other users present in the same living area when identification information of these other users is displayed as a list. A location information acquirer acquires location information showing a location measured in an information processing terminal. A display controller (70) carries out control to make identification information of a plurality of users be displayed on a specific terminal. The display controller (70) carries out control to make the identification information of the plurality of users be displayed in order according to timing when a reference location is measured by the specific terminal or the number of times of existence of a location shown by location information acquired from the information processing terminal corresponding to a user as a subject of display control in an area including the reference location about a case in which the location shown by the location information acquired from the information processing terminal corresponding to the user as the subject of the display control exists in the area including the reference location.

7 Claims, 19 Drawing Sheets

(51) Int. Cl.
*A63F 13/216* (2014.01)
*A63F 13/795* (2014.01)
*A63F 13/92* (2014.01)
*A63F 13/798* (2014.01)

(56) References Cited

FOREIGN PATENT DOCUMENTS

| | | | |
|---|---|---|---|
| JP | 2008176406 A | 7/2008 | |
| JP | 2011002865 A | 1/2011 | |
| JP | 2011076533 A | 4/2011 | |
| WO | 2012002426 A1 | 1/2012 | |

OTHER PUBLICATIONS

International Search Report for corresponding PCT Application No. PCT/2012/083893, dated Mar. 19, 2013.
International Search Report for corresponding EP Application No. 12867919, 7 pages, dated Feb. 2, 2016.

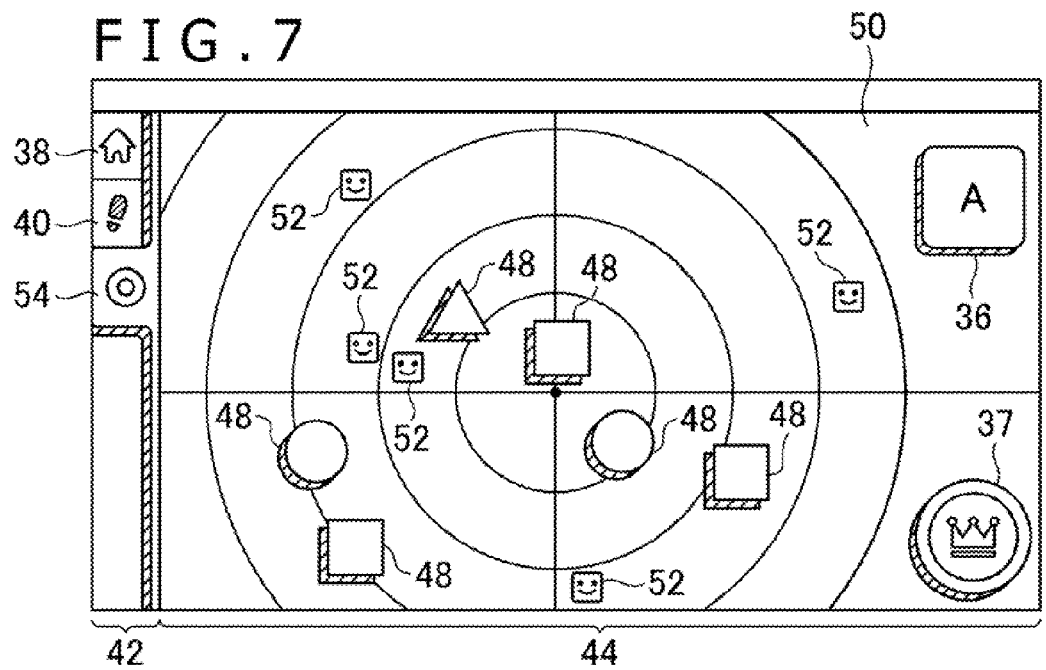
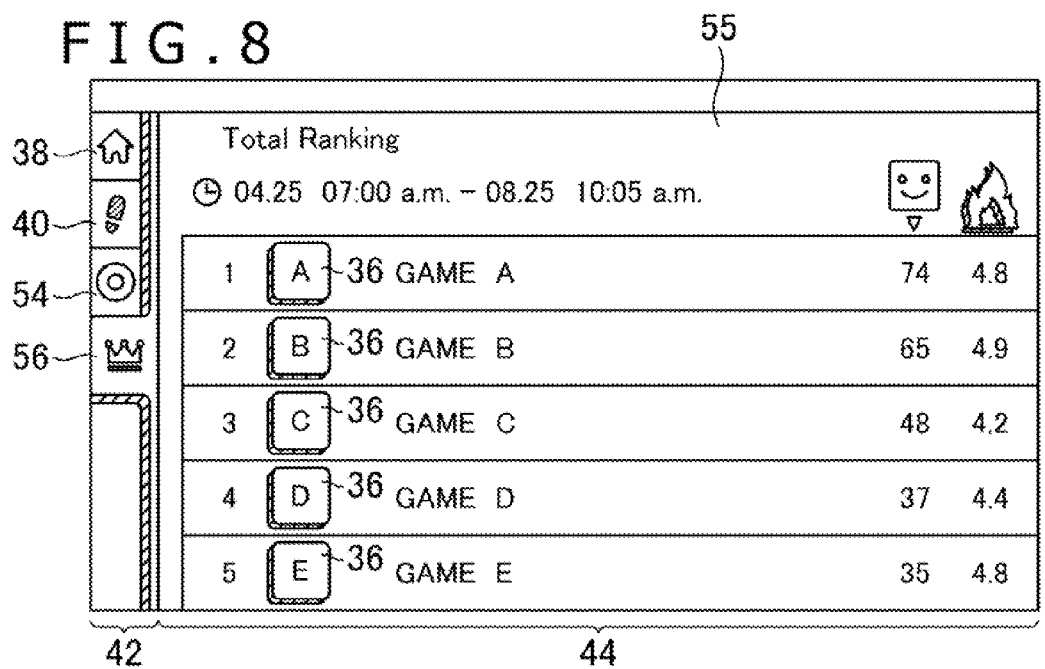

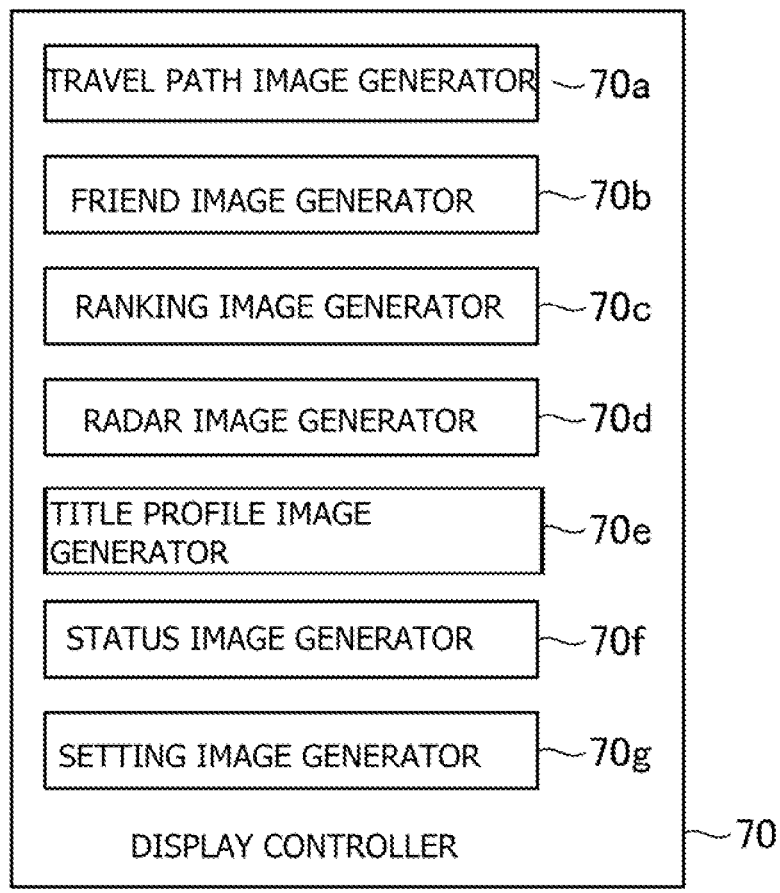

FIG.22

| TITLE ID | LEVEL | PLAY TIME | LAST PLAY DATE AND TIME | |
|---|---|---|---|---|
| T001 | 1 | 18h | 2010/6/25 | 13:15 |
| T003 | 4 | 110h | 2010/6/25 | 15:45 |
| T024 | 2 | 52h | 2010/7/1 | 9:23 |
| T013 | 3 | 61h | 2010/7/2 | 19:34 |
| T002 | 1 | 3h | 2010/6/23 | 13:08 |

F I G . 2 5

| AREA ID | TIME SLOT | GAME RECORD DATA 1 | | GAME RECORD DATA 2 | |
| --- | --- | --- | --- | --- | --- |
| | | TITLE ID | LEVEL | PLAY TIME | TITLE ID | LEVEL | PLAY TIME |
| 010010···· | 2010/6/10 12:00~18:00 | T001 | 3 | 102h | T011 | 2 | 80h |
| 010010···· | 2010/6/10 18:00~24:00 | T002 | 2 | 84h | T007 | 4 | 135h |

FIG. 26

AREA ID : 010010····

| USE ID | LOCATION COORDINATES | DATE AND TIME |
|---|---|---|
| U001 | $(X_1, Y_1)$ | 2010/6/8  13:24 |
| U013 | $(X_2, Y_2)$ | 2010/6/8  13:25 |

FIG. 27

| USER ID | LATEST LOCATION COORDINATES | DATE AND TIME | GAME RECORD DATA 1 | | | GAME RECORD DATA 2 | | |
|---|---|---|---|---|---|---|---|---|
| | | | TITLE ID | LEVEL | PLAY TIME | TITLE ID | LEVEL | PLAY TIME |
| U001 | (Xn,Yn) | 2010/6/12 12:10 | T001 | 1 | 18h | T003 | 4 | 110h |
| U002 | (Xm,Ym) | 2010/6/12 12:00 | T100 | 1 | 25h | T008 | 2 | 54h |

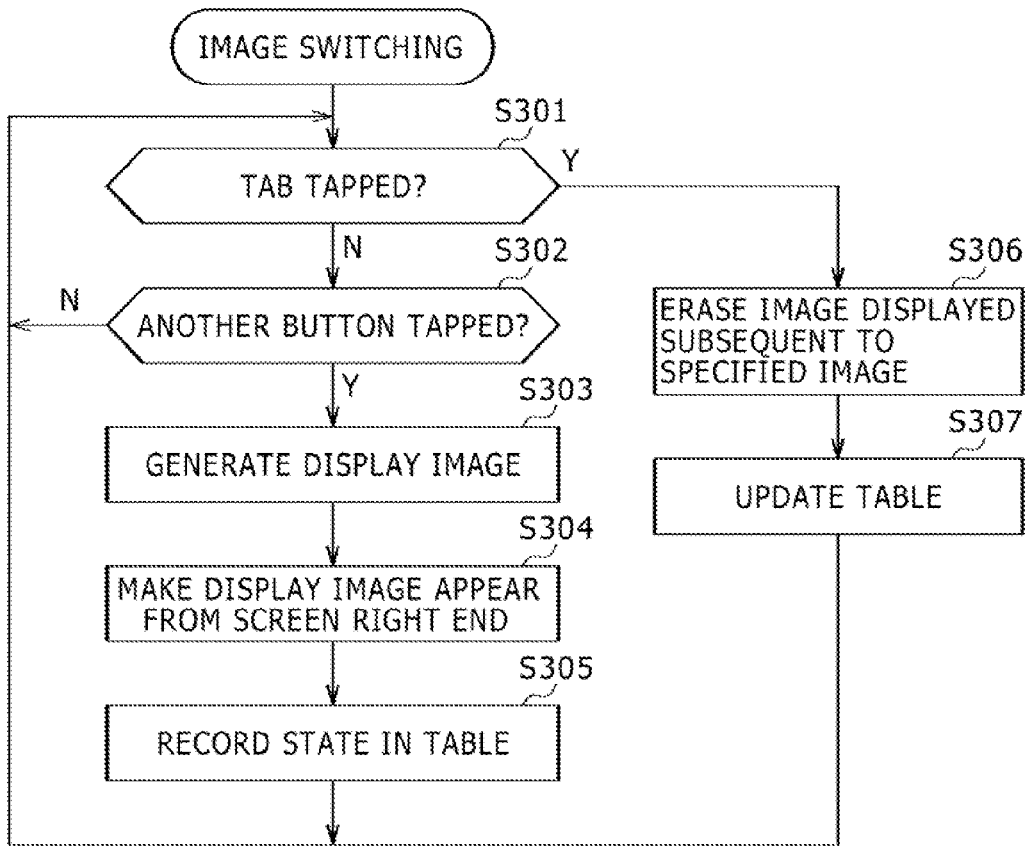

INFORMATION PROCESSING SYSTEM, INFORMATION PROCESSING TERMINAL, INFORMATION PROCESSING METHOD, PROGRAM, AND INFORMATION STORAGE MEDIUM

TECHNICAL FIELD

The present invention relates to an information processing system, an information processing terminal, an information processing method, a program, and an information storage medium.

BACKGROUND ART

Conventionally, a game system in which game terminals perform wireless communication with each other at a comparatively short distance to directly exchange game data is known. According to such a game system, a situation in which users of game terminals directly exchange game data when passing each other incidentally occurs, which allows strangers to exchange game data with each other without a burden. Furthermore, it becomes possible to realize the existence of other users present in the same living area.

SUMMARY

Technical Problem

The convenience of the user is enhanced by allowing realization of the existence of other users present in the same living area by communication among game terminals irrespective of whether or not short-distance wireless communication is used. Here, if identification information of other users present in the same living area is displayed in order according to the timing or the number of times of the presence in the same living area when the identification information is attempted to be displayed as a list on a game terminal of a certain user, it will become easy to find a user expected to have a high relevance (e.g. user with which the certain user will make friends highly probably) among these other users particularly when the number of other users present in the same living area is large. This applies to not only communication among game terminals but also communication among general information processing terminals.

The present invention is made in view of the above-described problems and one of objects thereof is to facilitate finding of a user expected to have a high relevance among other users present in the same living area when identification information of these other users is displayed as a list.

Solution to Problem

To solve the above-described problems, an information processing system according to the present invention is characterized by the following. The information processing system includes location information acquiring means that acquires, from each of a plurality of information processing terminals, location information showing a location measured in the information processing terminal and display control means that carries out control to make identification information of a plurality of users be displayed on a specific terminal that is the information processing terminal as a provision destination of information. The display control means carries out control to make the identification information of the plurality of users be displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

Furthermore, an information processing terminal according to the present invention is characterized by the following. The information processing terminal includes means that accepts information from a server that acquires, from each of a plurality of information processing terminals, location information showing a location measured in the information processing terminal and display control means that carries out control to make identification information of a plurality of users be displayed based on the accepted information. The display control means carries out control to make the identification information of the plurality of users be displayed in order according to timing when a reference location that is a location measured by the information processing terminal of oneself is measured by the information processing terminal of oneself or the number of times of existence of a location shown by location information acquired from the information processing terminal corresponding to a user as a subject of display control in an area including the reference location that is the location measured by the information processing terminal of oneself about a case in which the location shown by the location information acquired from the information processing terminal corresponding to the user as the subject of the display control exists in the area including the reference location.

In addition, an information processing method according to the present invention is characterized by the following. The information processing method includes a step of acquiring, from each of a plurality of information processing terminals, location information showing a location measured in the information processing terminal and a step of carrying out control to make identification information of a plurality of users be displayed on a specific terminal that is the information processing terminal as a provision destination of information. In the step of carrying out control, the control is so carried out that the identification information of the plurality of users is displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

Moreover, a program according to the present invention is characterized the following. The program causes a computer to function as location information acquiring means that acquires, from each of a plurality of information processing terminals, location information showing a location measured in the information processing terminal and display control means that carries out control to make identification information of a plurality of users be displayed on a specific terminal that is the information processing terminal as a provision destination of information. The display control means carries out control to make the identification information of the plurality of users be displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

Furthermore, an information storage medium according to the present invention is a computer-readable information storage medium in which a program characterized by the following is stored. The program causes a computer to function as location information acquiring means that acquires, from each of a plurality of information processing terminals, location information showing a location measured in the information processing terminal and display control means that carries out control to make identification information of a plurality of users be displayed on a specific terminal that is the information processing terminal as a provision destination of information. The display control means carries out control to make the identification information of the plurality of users be displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

According to the present invention, control is so carried out that the identification information of the plurality of users is displayed in order according to the timing when the reference location that is the location shown by location information acquired from the specific terminal is measured by the specific terminal or the number of times of existence of the location shown by the location information acquired from the information processing terminal corresponding to the user as the subject of the display control in the area including the reference location that is the location shown by the location information acquired from the specific terminal about a case in which the location shown by the location information acquired from the information processing terminal corresponding to the user as the subject of the display control exists in the area including the reference location. Therefore, it becomes easy to find a user expected to have a high relevance among other users present in the same living area when identification information of these other users is displayed as a list.

In one aspect of the present invention, it is characterized that the display control means carries out control to make the identification information of the plurality of users be displayed in order according to the degree of commonality between attributes of the user as the subject of the display control and attributes of a user corresponding to the specific terminal.

Furthermore, in one aspect of the present invention, it is characterized that the display control means carries out control to make the identification information of the plurality of users be displayed in order according to the degree of commonality between games played by the user as the subject of the display control and games played by the user corresponding to the specific terminal.

BRIEF DESCRIPTION OF DRAWINGS

FIG. 7 is a diagram showing one example of a radar image.

FIG. 8 is a diagram showing one example of a ranking image.

FIG. 20 is a diagram showing a configuration of a display controller.

FIG. 21 is a diagram schematically showing the contents of a location coordinate storage.

FIG. 22 is a diagram schematically showing the contents of a game record data storage.

FIG. 25 is a diagram schematically showing the contents of an area-by-area title ID storage.

FIG. 26 is a diagram schematically showing the contents of an area-by-area user ID storage.

FIG. 27 is a diagram schematically showing the contents of a user information storage.

FIG. 29 is a flow diagram for explaining image switching processing.

FIG. 30 is a diagram showing one example of a display image management table.

DESCRIPTION OF EMBODIMENTS

An embodiment of the present invention will be described in detail below based on the drawings.

Figure 1:
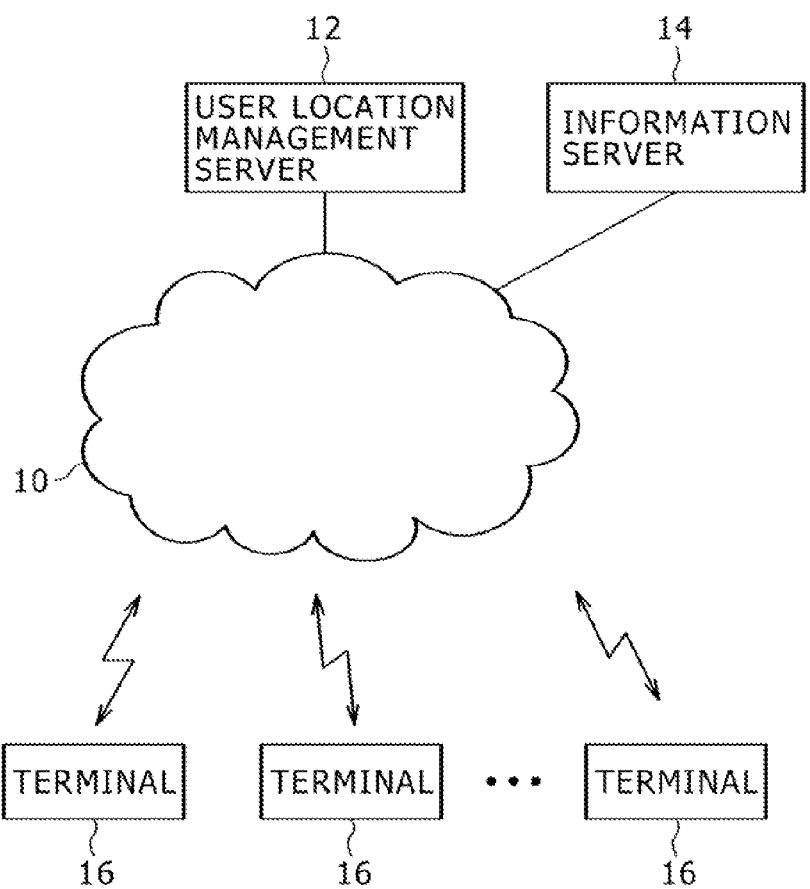
FIG. 1 is an overall configuration diagram of a communication system according to an embodiment of the present invention.
Figure 2:
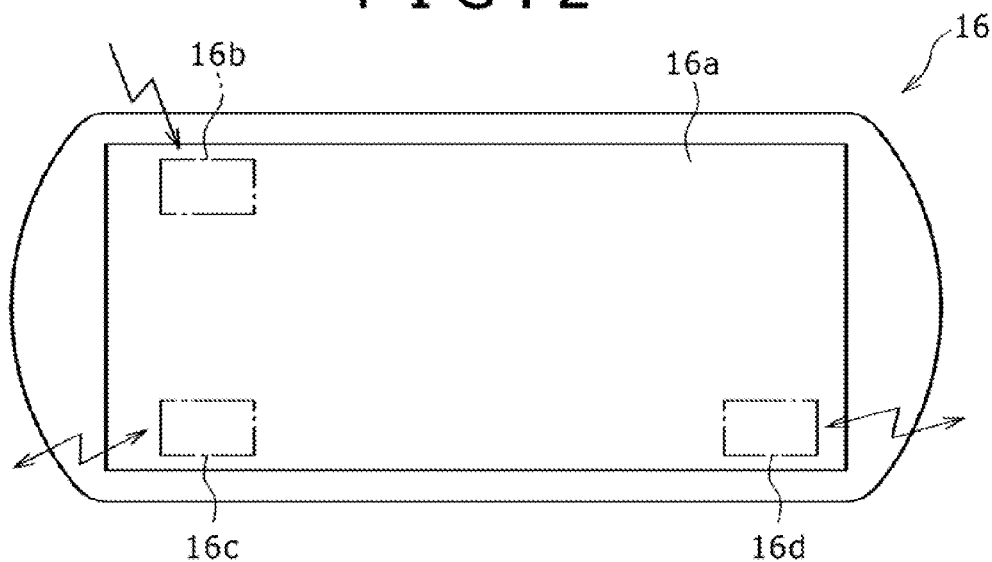
FIG. 2 is a diagram showing an appearance of a user terminal.

FIG. 1 is an overall configuration diagram of a communication system according to the embodiment of the present invention. As shown in the diagram, in this communication system, a user location management server 12, an information server 14, and plural user terminals (information processing terminals) 16 are connected to a computer communication network 10 such as the Internet. The user location management server 12 and the information server 14 are configured based mainly on e.g. publicly-known server computers. Furthermore, the user terminal 16 is a portable computer game system driven by a battery and is equipped with a touch screen 16a on its front surface as shown in FIG. 2, which shows the appearance of the user terminal 16. Moreover, the user terminal 16 includes, as built-in units, a positioning unit 16b measuring the location (latitude and longitude) of this user terminal 16 by utilizing the GPS (Global Positioning System), a mobile phone communication unit 16c performing data communication by use of a mobile telephone network, and a wireless LAN communication unit 16d for performing data communication by use of a wireless LAN. The user terminal 16 can connect to the computer communication network 10 to perform data communication with the user location management server 12 and the information server 14 by selectively utilizing the mobile phone communication unit 16c or the wireless LAN communication unit 16d according to the communication environment.

The user terminal 16 repeatedly measures its own location by utilizing a satellite signal and holds these positioning results. As described later, the user terminal 16 may perform positioning by another method. Furthermore, the user terminal 16 holds also data showing the execution record of game programs and the positioning results and the data of the execution record of games are uploaded to the user location management server 12 according to user operation or automatically every certain time. The user location management server 12 holds the positioning results and the data of the execution record uploaded in this manner from a large number of user terminals 16. In each user terminal 16, an image showing the travel path of the user terminal 16 (see FIG. 5) is displayed on the touch screen 16a based on the information held in the user location management server 12 in this manner and the positioning results held in the user terminal 16.

Figure 3:
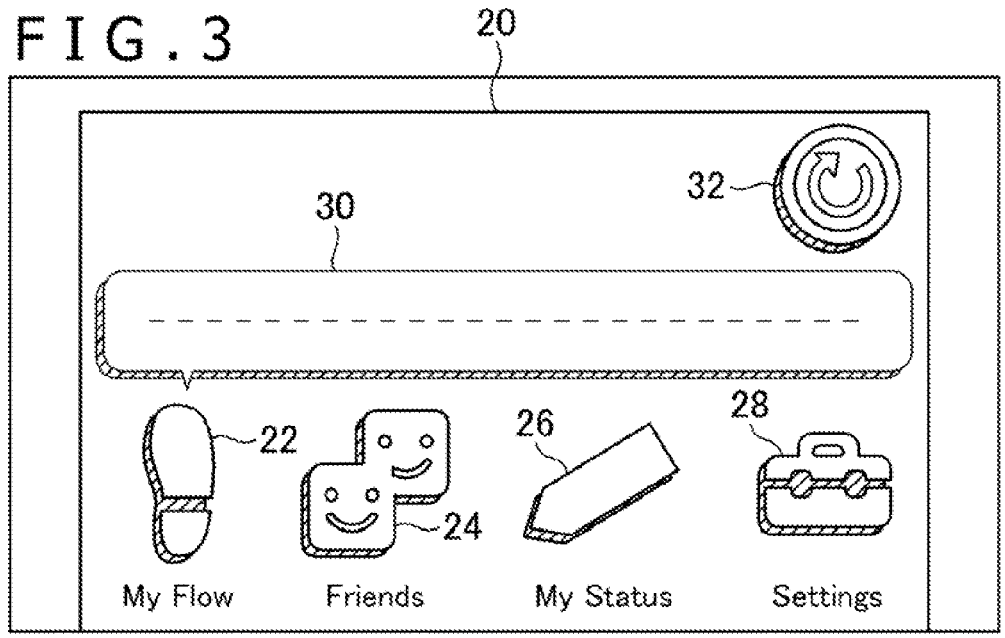
FIG. 3 is a diagram showing one example of a main menu image.

FIG. 3 shows one example of a main menu image displayed on the touch screen 16a of the user terminal 16. This image is one displayed first after the user terminal 16 is activated and this application program is run. In this image, a mat board 20 is represented and buttons 22, 24, 26, 28, and 32 and a message 30 disposed over it are also represented. The buttons 22, 24, 26, 28, and 32 and the message 30 are disposed in a virtual three-dimensional space separately from the mat board 20 and the main menu image shows a state obtained when these objects are viewed from a camera virtually disposed in this space. This image is generated by using a publicly-known three-dimensional computer graphics technique. At this time, shadows are drawn on sides of the buttons 22, 24, 26, 28, and 32 and the message 30. This allows the user to immediately understand that these objects are floating over the mat board 20 (to the virtual camera side). In the present embodiment, these objects floating over the mat board 20 indicate that they can be operated as buttons by the user through tapping of the touch screen 16a. After the main menu image is displayed, this program (display controller 70) determines whether programs associated with the respective buttons 22, 24, 26, 28, and 32 and the message 30 are executable every certain time. If determining that the programs are executable, this program makes them separate from the mat board 20 by a predetermined distance ("execution distance") as shown in FIG. 3. Until determining that the program is executable, this program brings the corresponding object close to the mat board 20 like the button 26 shown in FIG. 4. Specifically, the button 22, 24, 26, 28, or 32 or the message 30 whose associated program is not executable is in contact with the mat board 20 or separate from it by distance ("non-execution distance") shorter than the above-described execution distance.

Here, the button 22 is to display the above-described travel path image. The button 24 is to display a friend image to be described later. The button 26 is to display a status image. The button 28 is to display a setting image. Furthermore, the message 30 is to display information relating to the respective buttons 22, 24, 26, and 28. By tapping the region of the message 30, details of the message 30 can also be displayed. Moreover, the button 32 is to upload the above-described positioning results and data of the execution record of games to the user location management server 12. This button 32 is disposed separately from the mat board 20 by the execution distance when the present state becomes the state in which these data can be uploaded. Until this, the button 32 is disposed in contact with the mat board 20 or separately by the non-execution distance. Whether or not the present state is the state in which data can be uploaded is determined based on whether data communication is possible by the mobile phone communication unit 16c or the wireless LAN unit 16d and whether data that should be uploaded exists.

Figure 4:
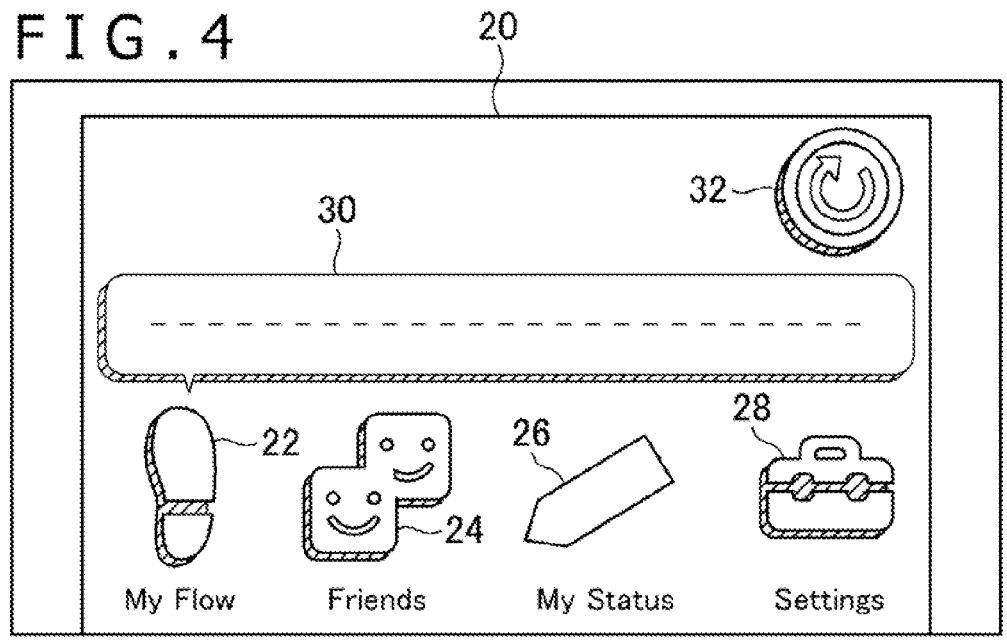
FIG. 4 is a diagram showing one example of the main menu image.
Figure 5:
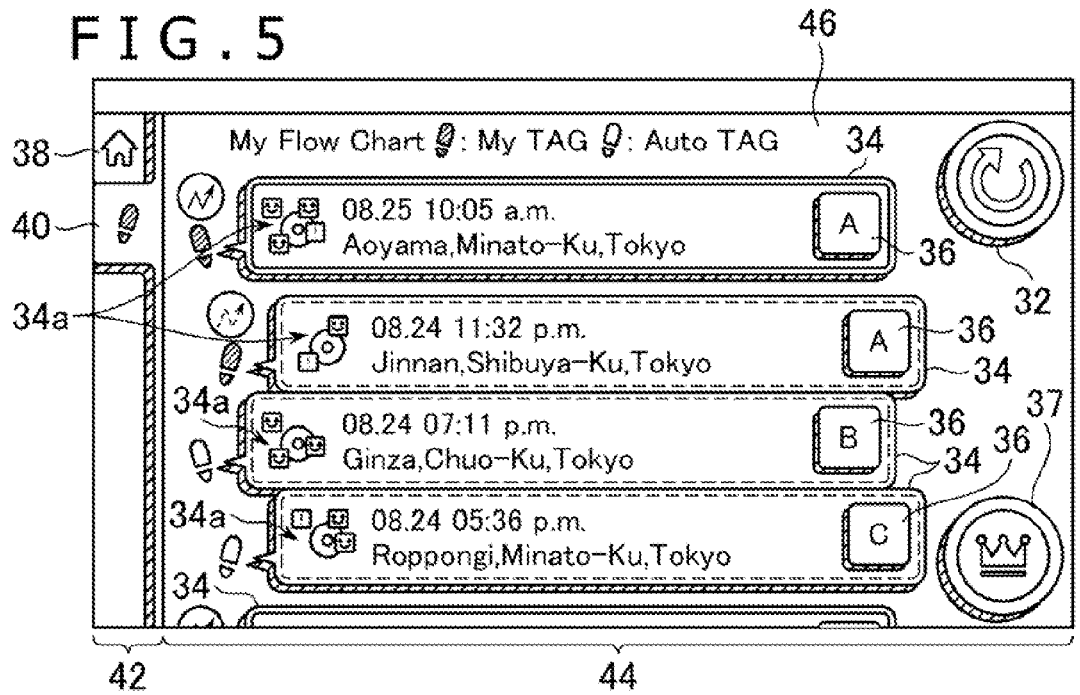
FIG. 5 is a diagram showing one example of a travel path image.

FIG. 5 shows one example of the travel path image. This image is one displayed when the button 22 included in the main menu image shown in FIG. 4 is tapped. The whole of the travel path image has a vertically-long shape actually and only a display range set as part thereof is displayed on the touch screen 16a. Furthermore, the user can move the display range by carrying out predetermined operation such as a flick to the touch screen 16a. This can display an arbitrary place of the whole of the travel path image on the touch screen 16a.

The user terminal 16 repeatedly measures its own location and holds these measured locations. In the travel path image, record frames 34 in which an address text indicating the held location and the timing of the positioning (in the present embodiment, e.g. measurement date and time) are shown are represented in the order of the measurement. That is, a newer measurement result is shown on the upper side. These record frames 34 are floating over a mat board 46 and can be tapped. Although here the record frame 34 in which address text and measurement date and time are shown is employed as information indicating the measured location, the record frame 34 in which only an address text is shown may be employed or only an address text may be shown. Furthermore, the address text may be one in which information to a block or house number is shown or may be only administrative district names of state, prefecture, city, town, village, etc. Furthermore, an icon in which a design indicating a location is represented may be employed as the information indicating the measured location. As described later, these pieces of information are obtained by converting the measured location.

While repeatedly measuring its own location by the positioning unit 16*b*, the user terminal 16 holds a newly measured location only when this newly measured location is separate from the latest location already held by a predetermined distance (e.g. 2 km) or longer. Conversely, if the newly measured location is separate from the latest location already held by only distance shorter than the predetermined distance, the user terminal 16 does not hold this newly measured location. Moreover, a predetermined number (e.g. 20) of positioning results are held in the user terminal 16 and some positioning results that are significant to show the travel path of the user terminal 16 are selected among them. For example, an evaluation value as an increasing function of the elapsed time from the previous positioning time and the distance from the location obtained by the previous positioning is calculated about each positioning result and a predetermined number (e.g. 10) of positioning results are selected from the upper levels thereof. Then, only the record frames 34 corresponding to the selected positioning results are made to be included in the travel path image. This can show only significant travel in the travel path image and provide the travel path image that is easy to understand. Furthermore, useless displaying can be suppressed and the touch screen 16*a* can be efficiently used.

Furthermore, a situation image 34*a* is represented at the left end of each record frame 34. This situation image 34*a* indicates the number of other user terminals 16 that have uploaded the same location to the user location management server 12, whether or not the user terminal 16 of another user as a friend also has measured the location measured by the user terminal 16 and uploaded to the user location management server 12 and has uploaded this location to the user location management server 12, and so forth. This allows the user to understand, at a glance, how many other users who possess the user terminal 16 were present and whether a friend was present about each location. In each record frame 34, a title 36 of a game program of note is also represented. At the lower right part of the travel path image, a button 37 is also disposed. This button 37 is to display a ranking image to be described later on the touch screen 16*a*.

On the left side of each record frame 34, a white or black footprint image is represented. The white footprint image shows that the corresponding record frame 34 is one indicating a result obtained by automatically performing positioning every certain time. Furthermore, the black footprint image shows that the corresponding record frame 34 is one indicating a result obtained by performing positioning according to operation by the user. Moreover, of the record frames 34, one surrounded by a solid line indicates that a positioning result and so forth are uploaded according to operation by the user, and one surrounded by a solid line indicates that they are uploaded by automatic upload carried out every certain time.

As shown in FIG. 5, a vertically-long region at the left end of the screen of the touch screen 16*a* is a tab region 42 and tab images 38 and 40 are displayed in this tab region 42. The tab images 38 and 40 are disposed from the upper side in the order of displaying. Furthermore, the right side of the tab region 42 is a main region 44. In this region, the travel path image is disposed. The plural tab images 38 and 40 are displayed in the tab region 42. The tab image 38 associated with the main menu image is disposed at the uppermost position and the tab image 40 associated with the image currently displayed in the main region 44 is disposed at the lowermost position. As the respective tab images 38 and 40, images indicating which images they are associated with are represented as icons.

Figure 6:
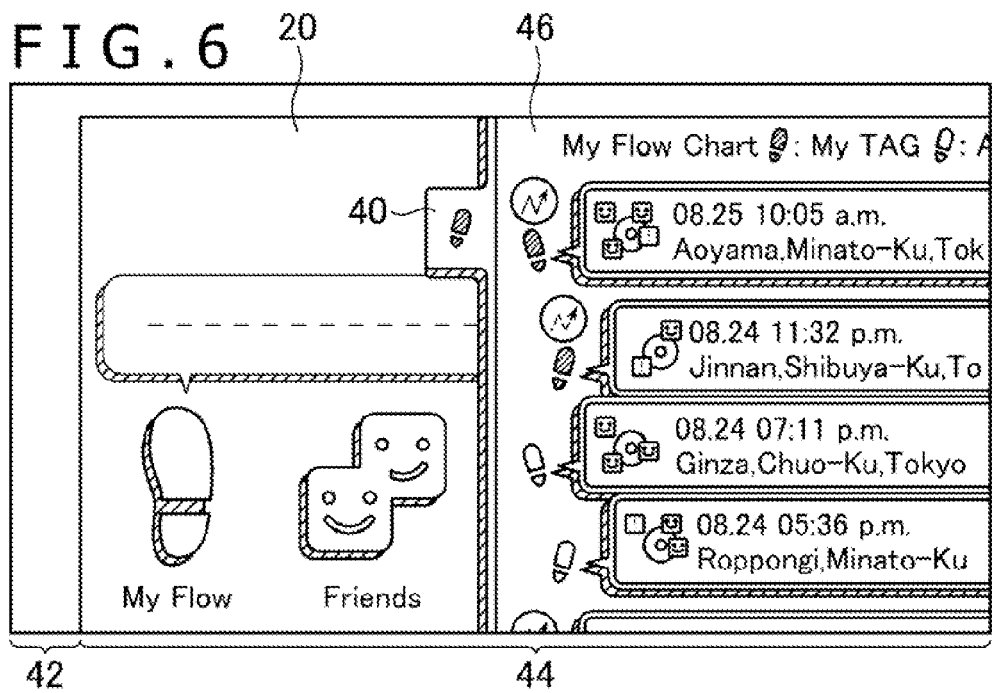
FIG. 6 is a diagram showing switching from the main menu image to the travel path image.

As shown in FIG. 6, when the button 22 is touched in the main menu image shown in FIG. 3, the travel path image and the tab image 40 linked with it appear from the right end of the touch screen 16*a*. These images slide in the left direction and the travel path image hovers over the main menu image. Therefore, in the main region 44, the travel path image is displayed instead of the main menu image. Furthermore, the tab image 40 enters the tab region 42. Other images to be described later also appear on the touch screen 16*a* similarly. The tab image 38 associated with the main menu image appears at the uppermost part of the tab region 42 when any image other than the main menu image is displayed in the main region 44.

FIG. 7 shows a radar image displayed on the touch screen 16*a* when the record frame 34 is tapped in the travel path image in FIG. 5. The radar image also appears together with a tab image 54 from the right end of the touch screen 16*a* similarly to the travel path image. A black circle indicating oneself is represented at the center of the radar image and avatar images 48 of other users who set the privacy setting "open" are represented around it. The avatar images 48 are so disposed as to float over a mat board 50 and can be tapped. Furthermore, in the radar image, small images 52 implying the existence of other users who set the privacy setting "closed" are also represented. Here, for the avatar image 48, its display position in the touch screen 16*a* is decided based on the location actually measured by the positioning unit 16*b*. Specifically, the relative position of another user relating to "open" on the basis of the position of oneself is calculated based on the location measured by the positioning unit 16*b* and uploaded to the user location management server 12 and the display position of each avatar image 48 in the touch screen 16*a* is decided based on the calculated relative position. On the other hand, the display position of the small image 52 in the touch screen 16*a* is decided in accordance with random numbers.

FIG. 8 shows a ranking image displayed on the touch screen 16*a* when the user taps the button 37 in the radar image in FIG. 7. This image is displayed also when the button 37 included in the travel path image in FIG. 5 is tapped. The respective elements disposed in the ranking image are disposed over a mad board 55. As shown in the diagram, in the ranking image, the titles of game programs played in the user terminals 16 that have uploaded the same location as that of the user of this user terminal 16 to the user location management server 12 are displayed. The respective titles are displayed in order of the number of user terminals 16 in which the game program of the relevant title is played. On the right side of each title, the number of user terminals 16 in which the game program of this title is played is displayed. The ranking image also has a vertically-long shape as a whole and only a display range set as part thereof is displayed on the touch screen 16*a*. Furthermore, the user can move the display range by carrying out predetermined operation such as a flick to the touch screen 16*a*.

Figure 9:
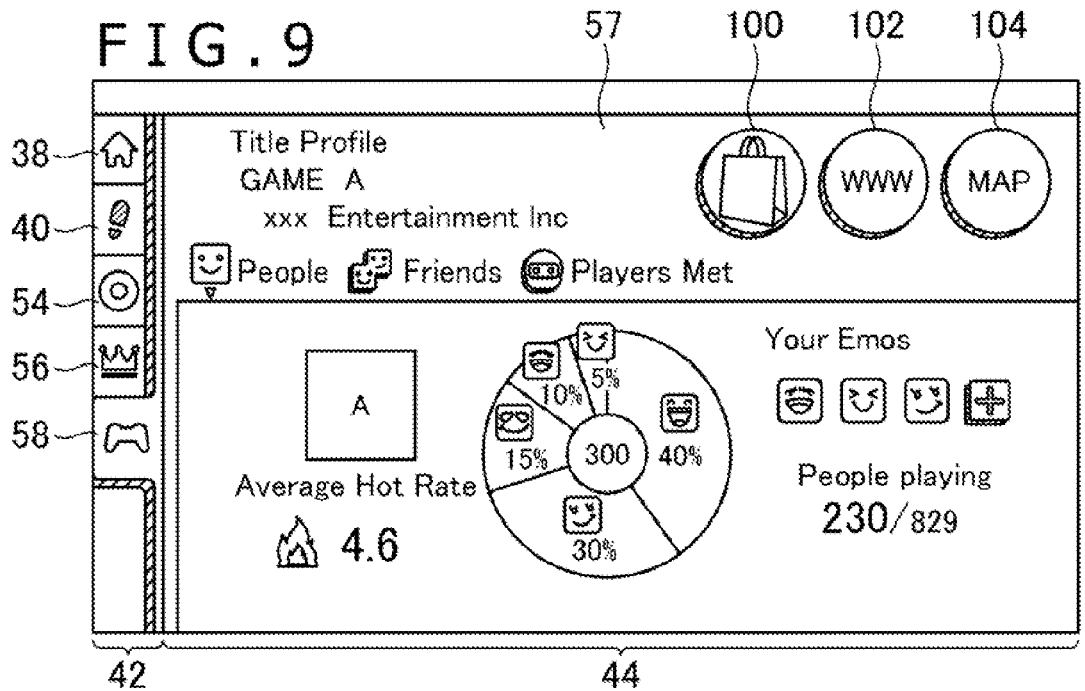
FIG. 9 is a diagram showing one example of a title profile image.

FIG. 9 shows a title profile image displayed on the touch screen 16*a* when the title 36 of any game program is tapped in the ranking image in FIG. 8. This image is displayed also when any title 36 is tapped in the travel path image in FIG. 5 or the radar image in FIG. 7. In the title profile image, an information field showing the evaluations and play status of other users regarding the relevant game program is included. The contents of the information field are received from the information server 14 for example. Buttons 100, 102, and 104 disposed over a mat board 57 are included in the title profile image. When the button 100 is tapped, a web browser is launched and a web page of an electronic commerce site in which this game title can be purchased is displayed on the touch screen 16*a*. Furthermore, when the button 102 is tapped, the web browser is launched to access a search site with this game title employed as a search string. Then, a list of sites distributing information relating to the game title is displayed on the touch screen 16*a*. Moreover, when the button 104 is tapped, the web browser is launched to access a map site. Then, a map indicating the places of shops that sell software of the game title is displayed on the touch screen 16*a*. The title profile image also has a vertically-long shape and only a display range set as part thereof is displayed on the touch screen 16*a*. Furthermore, the user can move the display range by carrying out predetermined operation such as a flick to the touch screen 16*a*.

Figure 10:
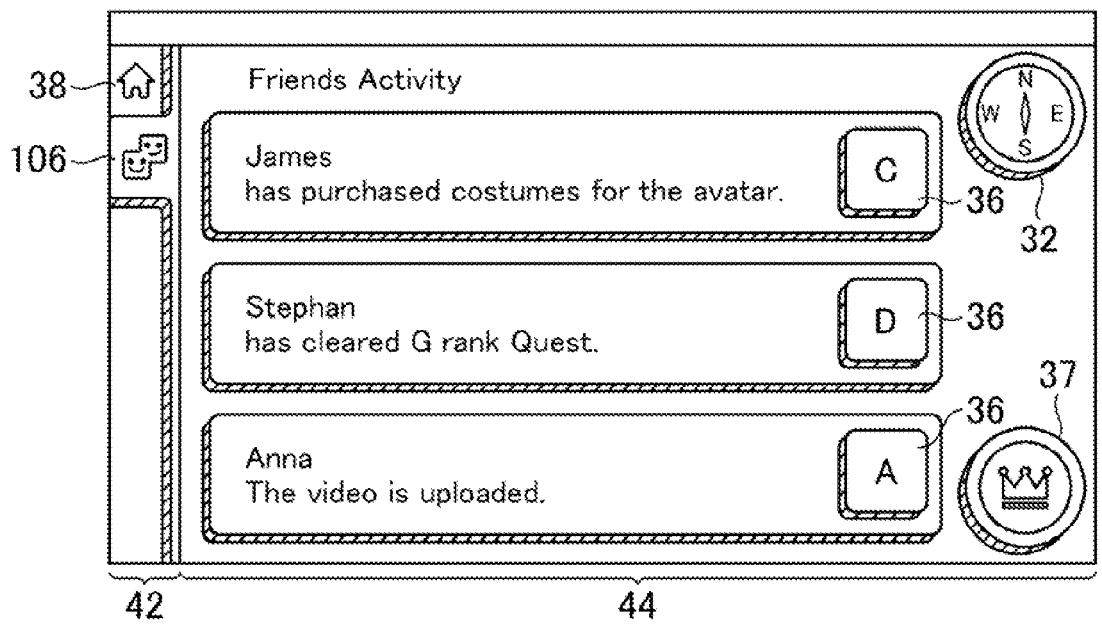
FIG. 10 is a diagram showing one example of a friend image.

FIG. 10 shows a friend image displayed on the touch screen 16*a* when the button 24 represented in the main menu image in FIG. 3 is tapped. As shown in the diagram, the latest information relating to the respective friends is shown in the friend image. The latest information is received from the information server 14 for example. The friend image also has a vertically-long shape and only a display range set as part thereof is displayed on the touch screen 16*a*. Furthermore, the user can move the display range by carrying out predetermined operation such as a flick to the touch screen 16*a*. A tab image 106 is linked with also the friend image.

Figure 11A:
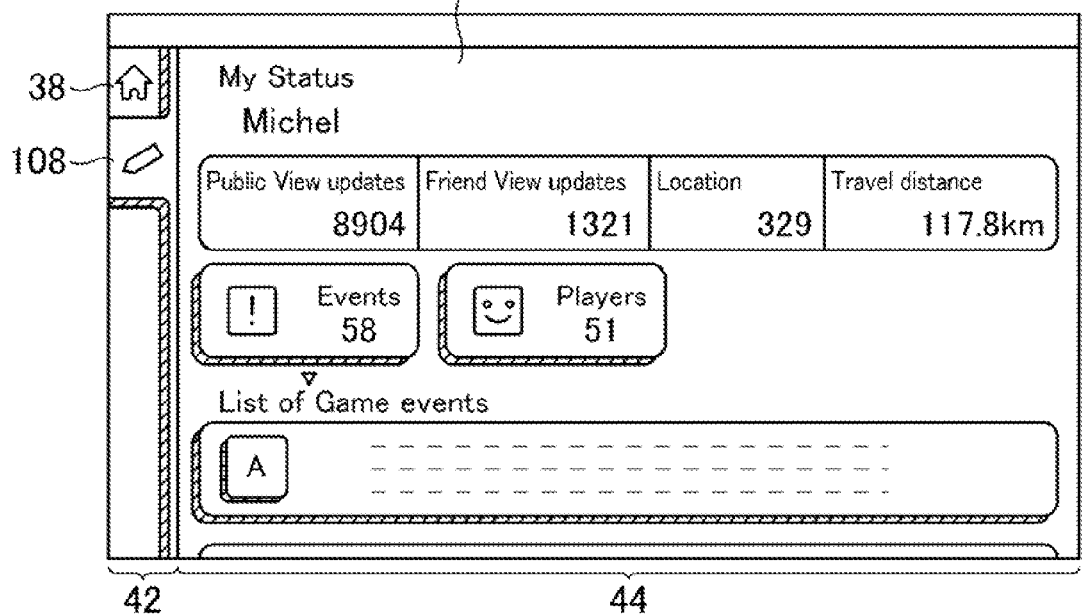
FIG. 11A is a diagram showing one example of a status image.
Figure 11B:
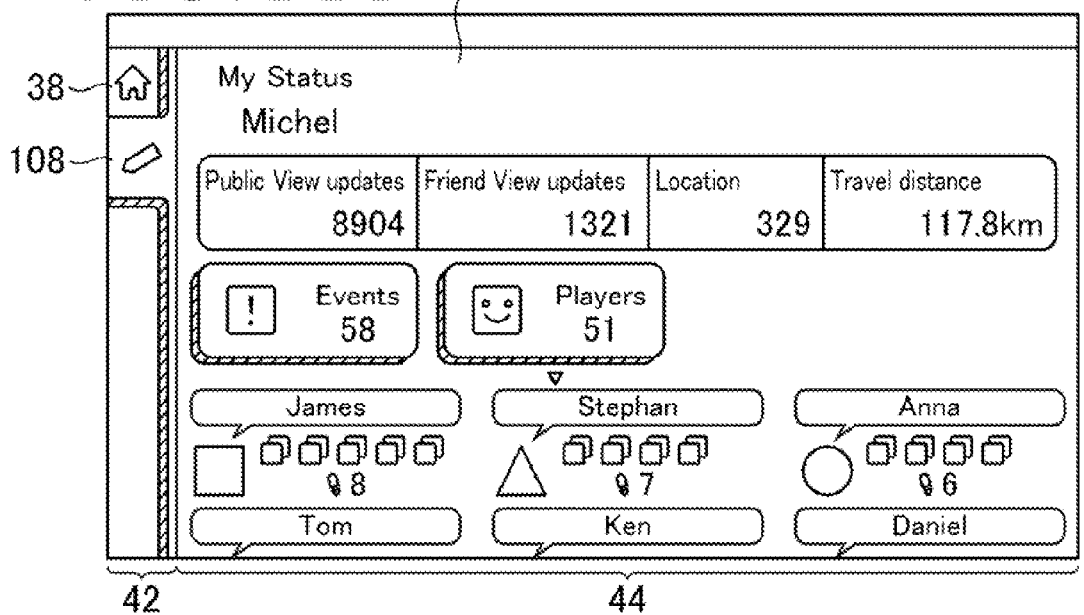
FIG. 11B is a diagram showing one example of the status image.

FIG. 11A shows a status image displayed on the touch screen 16*a* when the button 26 represented in the main menu screen in FIG. 3 is tapped. The status image shows information on the number of locations uploaded to the user location management server 12, the total travel distance, and so forth. These pieces of information are received from the information server 14 or calculated in the user terminal 16. A tab image 108 is linked with also the status image. Furthermore, in the status image, an image in which a text "Events" is shown and an image in which a text "Players" is shown are disposed in the virtual three-dimensional space separately from the mat board 20. In addition, shadows are drawn on sides of these images, which allows the user to immediately understand that these images are floating over the mat board 20 (to the virtual camera side). Moreover, these images can be tapped by the user. Furthermore, the image in which the text "Events" is shown or the image in which the text "Players" is shown is tapped by the user and thereby information displayed on the lower side of the status image is switched. For example, when the button 26 represented in the main menu image in FIG. 3 is tapped and the image in which the text "Events" is shown is tapped by the user, as shown in FIG. 11A, the contents of events that have occurred (e.g. items acquired by the user) are displayed as a list on the lower side of the status image. On the other hand, when the image in which the text "Players" is shown is tapped by the user, as shown in FIG. 11B, information corresponding to users who satisfy a condition to be described later (user corresponding information) is displayed as a list on the lower side of the status image.

Figure 12:
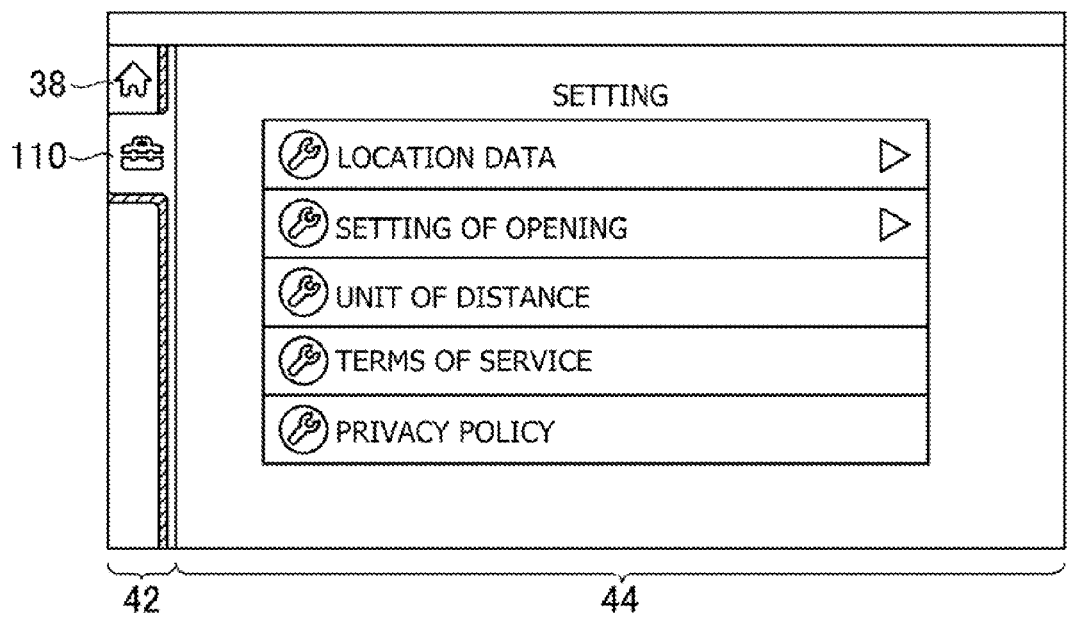
FIG. 12 is a diagram showing one example of a setting image.

FIG. 12 shows a setting image displayed on the touch screen 16*a* when the button 28 represented in the main menu image in FIG. 3 is tapped. A tab image 110 is linked with also the setting image.

Figure 13:
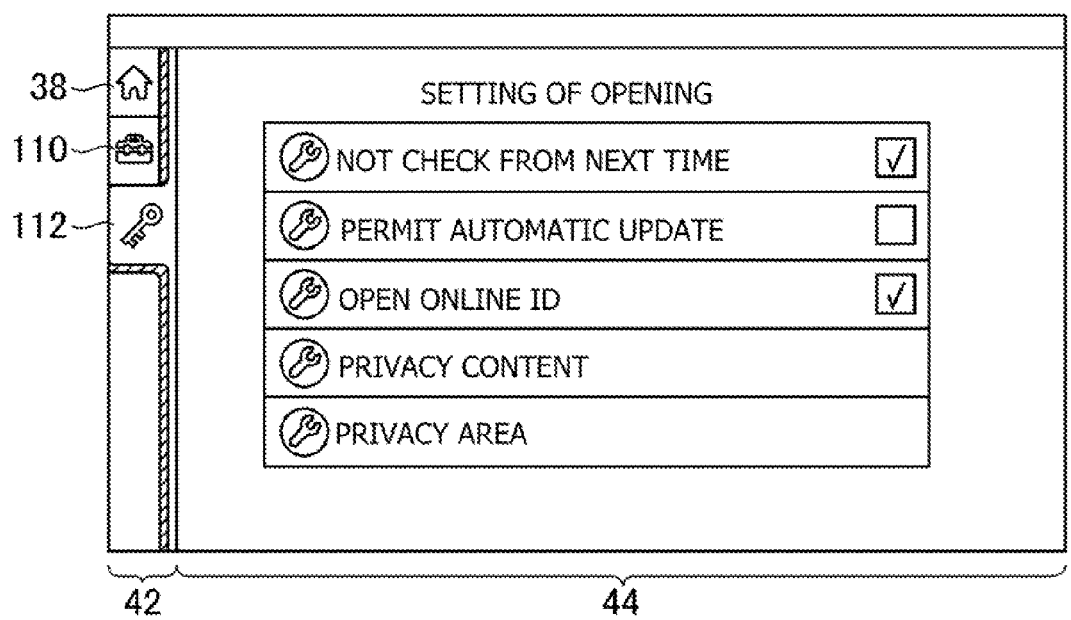
FIG. 13 is a diagram showing one example of an image for setting of opening.

When the user taps a region displayed as "Setting of Opening" in the setting image, an image for setting of opening exemplified in FIG. 13 is displayed on the touch screen 16*a*. In this image, the user taps a checkbox disposed on the right side of a region displayed as "Open Online ID" and thereby the private setting can be switched to either "open" or "closed." A tab image 112 is linked with also the image for setting of opening.

Figure 14:
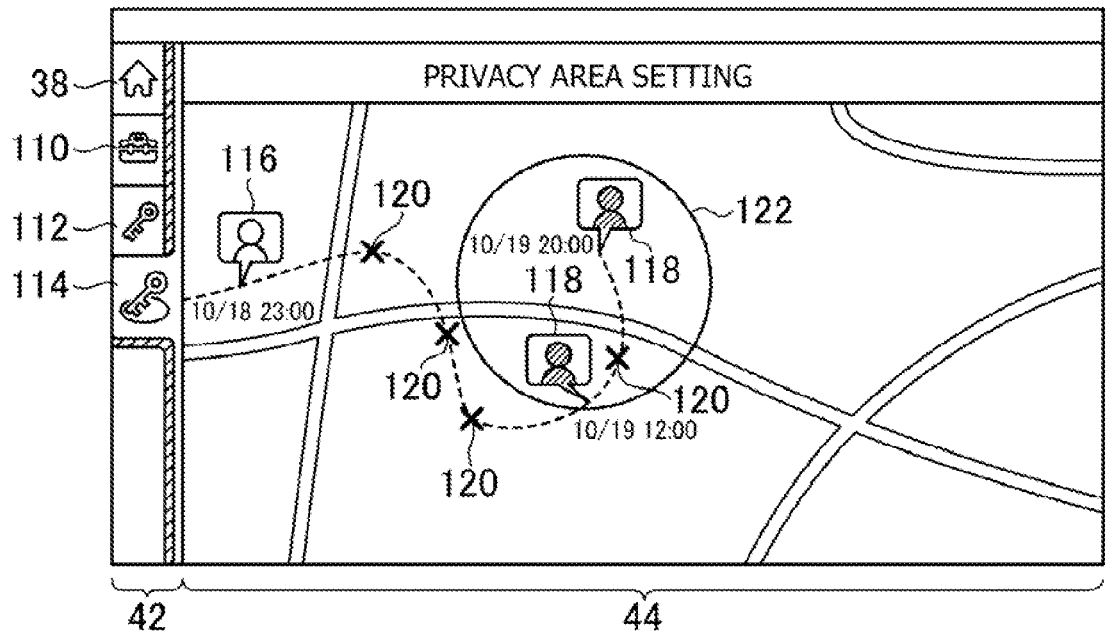
FIG. 14 is a diagram showing one example of a privacy area setting image.

Furthermore, if the user taps a region displayed as privacy area in the image for setting of opening in the state in which the private setting is "open," a privacy area setting image exemplified in FIG. 14 is displayed on the touch screen 16*a*. In the privacy area setting image, the user can set a predetermined number (e.g. up to five) of privacy areas. In the present embodiment, at this time, the location coordinates (latitude and longitude) of the center point of the privacy area are stored in the user terminal 16. Furthermore, a tab image 114 is linked with also the privacy area setting image. In the present embodiment, the inside and outside of the privacy area are partitioned by a circle equivalent to a 2-km-diameter circle.

Here, a procedure to display an already-displayed image in the main region 44 by using the tab image will be described. In the user terminal 16, by tapping any tab image displayed in the tab region 42, the image associated with this tab image can be displayed in the main region 44 again. For example, if the main menu image shown in FIG. 3, the travel path image shown in FIG. 5, the radar image shown in FIG. 7, the ranking image shown in FIG. 8, and the title profile image shown in FIG. 9 are displayed in the main region 44 in that order, the tab images 38, 40, 54, 56, and 58 corresponding to these images are displayed in the tab region 42 sequentially from the upper side. When the tab image 54 among them is tapped, the displaying returns to that shown in FIG. 7. That is, the radar image associated with the tab image 54 specified by the user is displayed in the main region 44 again. At this time, the tab images 56 and 58, which appeared in the tab region 42 after the tapped tab image 54, are erased from the tab region 42.

Figure 15:
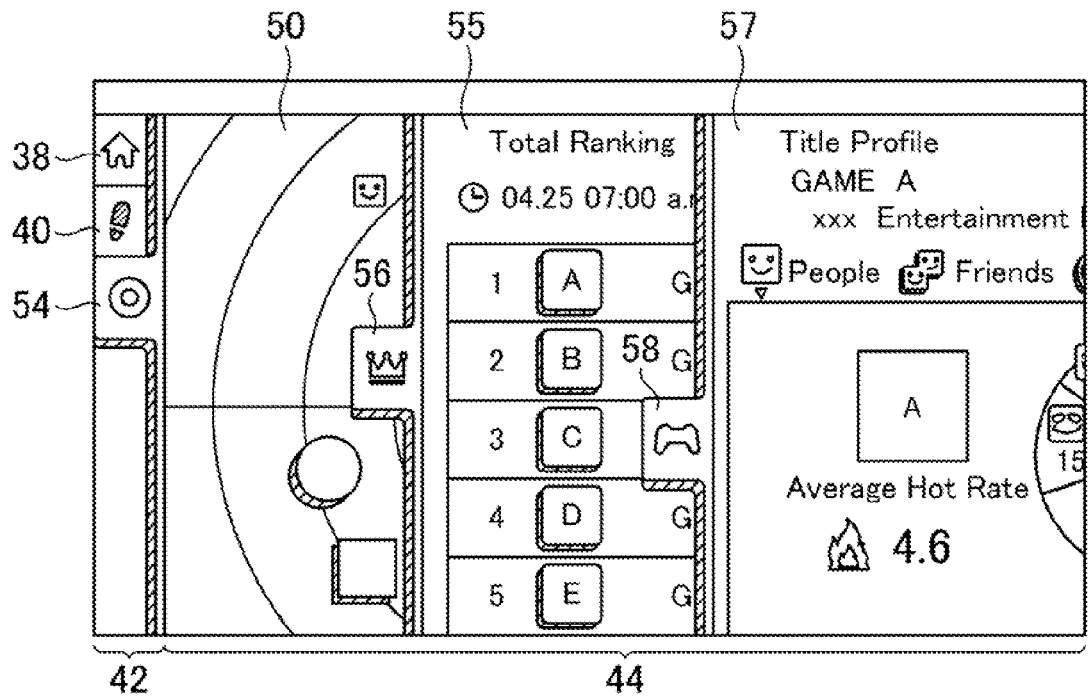
FIG. 15 is a diagram showing switching from the title profile image to the radar image.

Specifically, as shown in FIG. 15, the title profile image slides in the right direction in the state of being linked with the tab image 58 to disappear from the right end of the touch screen 16*a*. Furthermore, after the start of the movement of the tab image 58 and the title profile image and before the disappearance of these images, the ranking image also slides in the right direction in the state of being linked with the tab image 56 to disappear from the right end of the touch screen. The respective images (objects of mat boards) displayed in the main region 44 in the virtual three-dimensional space are separate from each other and are arranged in the order of the displaying, and the image displayed last is closest to the virtual camera side. Furthermore, the tab images each associated with a respective one of the images are each disposed on the same plane as that of this image. Thus, when the image in the main region 44 moves in a sliding manner, the image displayed in the main region 44 immediately previous to this image appears. In this manner, by moving the title profile image and the ranking image displayed in the main region 44 subsequent to the radar image associated with the tab image 54 specified by the user together with the tab images 58 and 56 sequentially from the newer image, the radar image associated with the tab image 54 specified by the user can be displayed in the main region 44 again. This can permit the user to understand how the image displayed in the main region 44 is switched.

Figure 16:
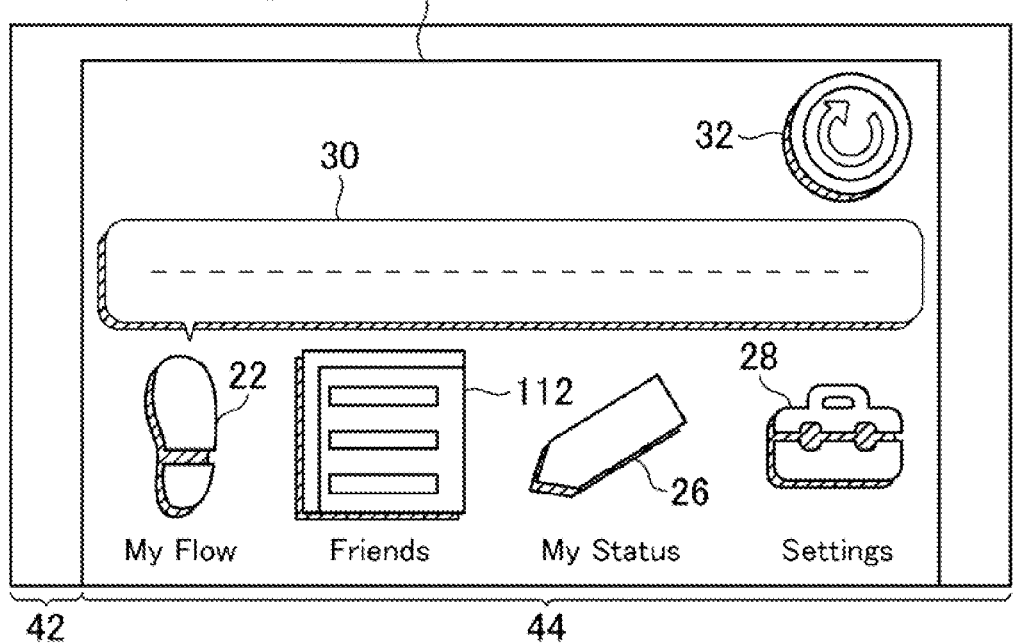
FIG. 16 is a diagram showing one example of the main menu image displayed again.

Furthermore, when the tab image 38 displayed in the tab region 42 is tapped, the main menu image associated with it is displayed in the main region 44 again as shown in FIG. 16. At this time, the tab image 38 displayed in the tab region 42 is erased. Furthermore, of the buttons 22, 24, 26, and 28 shown in the main menu image, one already tapped is replaced by an image made by reducing the image displayed in the main region 44 immediately previously. Also by tapping this reduced image, the travel path image, friend image, status image, or setting image can be displayed in the main region 44 similarly. Displaying the reduced image allows the user to immediately understand what kind of operation the user carried out. In the case of displaying a larger number of tab images than a predetermined number in the tab region 42, they are virtually so disposed as to be planarly lined along the vertical direction. In addition, only the predetermined number of adjacent tab images are displayed in the tab region 42. Furthermore, the predetermined number of other tab images are allowed to be displayed in the tab region 42 through flicking of the tab region 42. If this is employed, an arbitrary image can be displayed in the main region 44 again by making an arbitrary tab image be displayed in the tab region 42 by a flick and tapping this tab image. Furthermore, even in the case of displaying a larger number of tab images than a predetermined number in the tab region 42, the size of each tab image is not reduced and thus the user can easily tap these images.

Here, processing of deciding the position of each record frame 34 in the travel path image shown in FIG. 5 will be described. As shown in FIG. 5, the record frames 34 are disposed with offsets in the horizontal direction and are so disposed as to be juxtaposed in the vertical direction. Furthermore, the offset in the horizontal direction indicates the positioning time. Moreover, the interval of the adjacent record frames 34 indicates the distance between the locations corresponding to these record frames 34 and whether the positioning times are across a predetermined time (3 a.m.).

Figure 17:
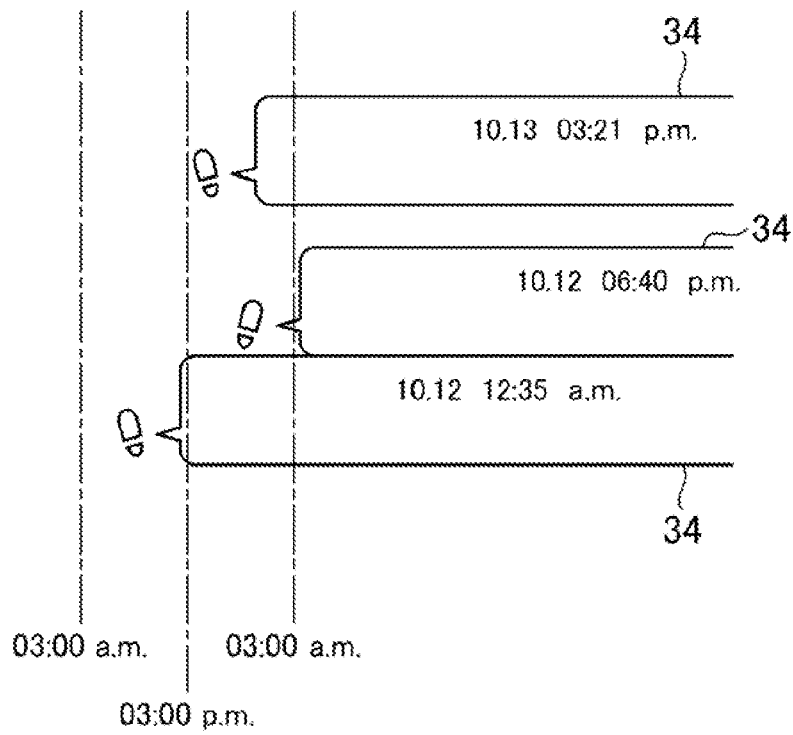
FIG. 17 is a diagram for explaining placement of records included in the travel path image.

Specifically, as shown in FIG. 17, the display position of the record frame 34 has a predetermined width in the horizontal direction. The left end corresponds to a predetermined reference time and the right end corresponds to the time after the elapse of 24 hours from it. Furthermore, when the record frame 34 is displayed, the positioning time corresponding to this record frame 34 is acquired and where this positioning time is located in the horizontal width is calculated. At this time, with the left end defined as the above-described predetermined reference time and with the right end defined as the time after the elapse of 24 hours from it, the distance from the left end and the elapsed time from the above-described predetermined reference time may be deemed to have a linear relationship. Specifically, a position offset from the end toward the right by ∂% may be made to correspond to the time after the elapse of 24 hours×∂% from the above-described predetermined reference time. This allows to grasp the schematic positioning time by merely seeing the display position of the record frame 34 in the horizontal direction.

Figure 18:
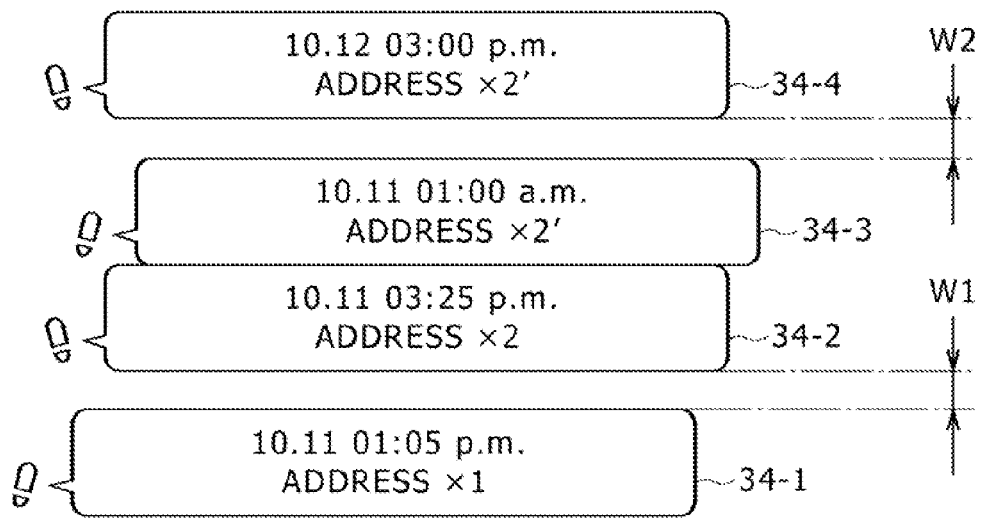
FIG. 18 is a diagram for explaining placement of the records included in the travel path image.

Furthermore, as shown in FIG. 18, if the interval of the location coordinates each corresponding to a respective one of the adjacent record frames 34 is shorter than a predetermined distance (e.g. 10 km), the interval of these record frames 34 is set zero. That is, both are so displayed as to abut on each other. For example, in FIG. 18, the distance between the location coordinates corresponding to record frames 34-2 and 34-3 does not surpass 10 km and both are so displayed as to abut on each other without a gap.

Furthermore, if the interval of the location coordinates each corresponding to a respective one of the adjacent record frames 34 is equal to or longer than the above-described predetermined distance, the interval is linearly expanded according to the excess over this predetermined distance. At this time, the interval of the record frames 34 is kept from surpassing a predetermined upper-limit interval Wmax. For example, in FIG. 18, the distance between the location coordinates corresponding to the record frames 34-1 and 34-2 is longer than 10 km and both are displayed separately by distance W1 (provided that W1≤Wmax) obtained by multiplying the excess over 10 km by a predetermined coefficient.

Moreover, if the positioning times each corresponding to a respective one of the adjacent record frames 34 are across the predetermined time (e.g. 3 a.m.), the interval is expanded by a predetermined percentage (e.g. 20%) of the upper-limit interval Wmax. Also at this time, the interval of the record frames 34 is kept from surpassing the predetermined upper-limit interval Wmax. For example, in FIG. 18, the distance between the location coordinates corresponding to the record frames 34-3 and 34-4 is shorter than 10 km. However, the positioning times are across 3 a.m. and both are separate by distance W2 (provided that W2≤Wmax) equivalent to the predetermined percentage of the predetermined upper-limit interval Wmax. In the above-described manner, it can be enabled to understand the intervals of the location coordinates each corresponding to a respective one of the record frames 34 and the positioning dates by merely seeing the intervals of the record frames 34.

Figure 19:
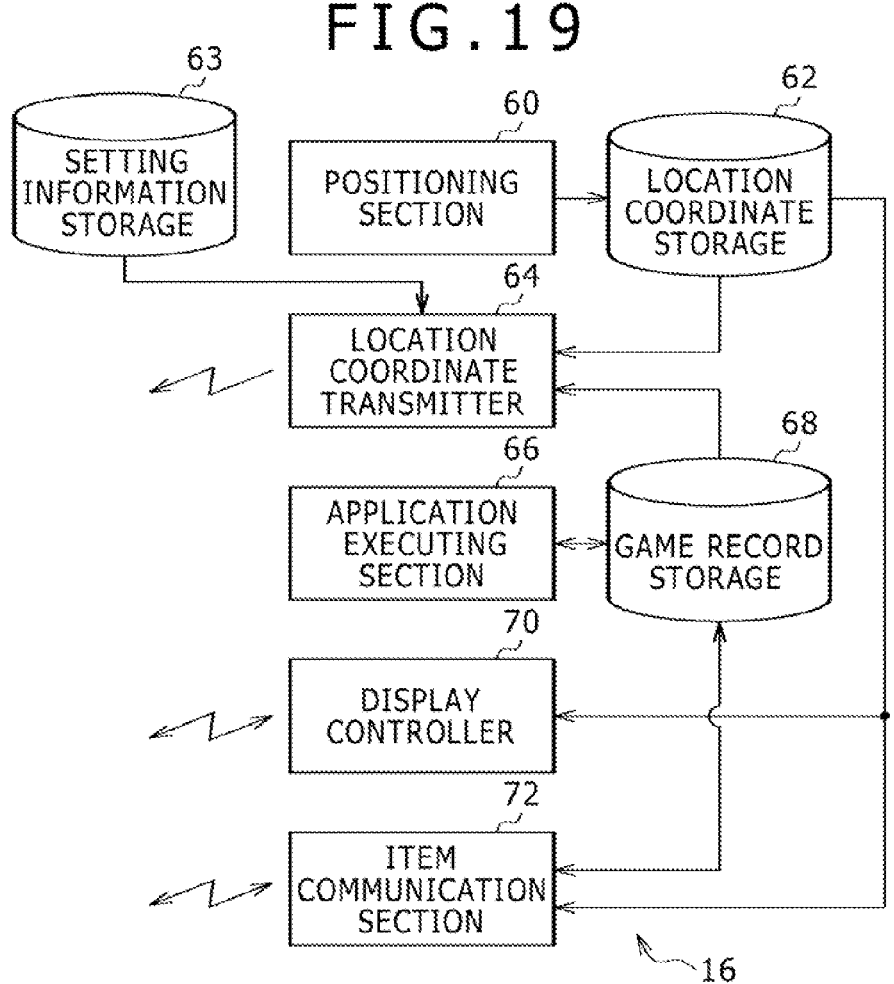
FIG. 19 is a functional block diagram of the user terminal.

The configuration of the communication system explained above will be described in more detail. FIGS. 19 and 20 are functional block diagrams of the user terminal 16. As shown in FIG. 19, the user terminal 16 functionally includes a positioning section 60, a location coordinate storage 62, a setting information storage 63, a location coordinate transmitter 64, an application executing section 66, a game record storage 68, a display controller 70, and an item communication section 72. As shown in FIG. 20, the display controller 70 includes a travel path image generator 70a, a friend image generator 70b, a ranking image generator 70c, a radar image generator 70d, a title profile image generator 70e, a status image generator 70f, and a setting image generator 70g. These functions are implemented by execution of a program according to the embodiment of the present invention in the user terminal 16 as a computer game system. This program may be downloaded from another computer via the computer communication network 10 or may be stored in a computer-readable information storage medium such as a CD-ROM or DVD-ROM and installed into the user terminal 16 from it. In this case, a media reading device for reading the program from the medium is included in the user terminal 16 as a built-in device or attached thereto as an external device.

First, the positioning section 60 is configured based mainly on the positioning unit 16b. It activates the positioning unit 16b periodically (e.g. every 30 minutes) to receive a satellite signal (GPS signal) and generates location coordinates (latitude and longitude) from it. Also when the user demonstratively orders positioning by using the touch screen 16a, the positioning section 60 may activate the positioning unit 16b to receive the satellite signal and generate location coordinates from it. Alternatively, the positioning section 60 may acquire the location coordinates of the user terminal 16 based on the identification information of a wireless access point with which communication is possible by the wireless LAN communication unit 16d and other pieces of the necessary information. For example, the identification information of the wireless access point and the location coordinates are stored in advance in association with each other in a server that is connected to the computer communication network 10 and is not shown in the diagram. Furthermore, the positioning section 60 transmits identification information to this server to acquire the location coordinates associated with this identification information. The identification information of plural wireless access points and the intensity of radio waves from each wireless access point may be transmitted from the positioning section 60 to the serve, and the server may calculate location coordinates by performing weighting with the radio wave intensity and synthesizing the location coordinates of the respective wireless access points and return the location coordinates to the positioning section 60. Similarly, the positioning section 60 may acquire the location coordinates of the user terminal 16 based on the identification information of a mobile phone base station with which communication is possible by the mobile phone communication unit 16c and other pieces of the necessary information. Instead of that the positioning section 60 acquires location coordinates and transmits them to the user location management server 12, the identification information of the wireless access point or mobile phone base station and other pieces of the necessary information may be transmitted to the user location management server 12 and this user location management server 12 may acquire location coordinates corresponding to these pieces of information.

The location coordinate storage 62 is to store, as shown in FIG. 21, a predetermined number (e.g. 20) of location coordinates and the timing when these location coordinates are measured (in the present embodiment, e.g. measurement date and time) in association with each other. Every time generating location coordinates, the positioning section 60 reads out the location coordinates stored last in the location coordinate storage 62 and calculates the distance between the newly generated location coordinates and the read location coordinates. Then, if the calculated distance is equal to or longer than a predetermined distance (e.g. 2 km), the newly generated location coordinates are stored in the location coordinate storage 62 together with the measurement date and time of these location coordinates. At this time, pairs of location coordinates and measurement date and time from which a predetermined number of days (e.g. seven days) have elapsed are deleted. Furthermore, if as many pairs of location coordinates and measurement date and time from which the predetermined number of days have not elapsed as the above-described predetermined number of pairs have been already stored in the location coordinate storage 62, the oldest pair of location coordinates and measurement date and time is deleted. Instead, the newly generated location coordinates are stored together with the measurement data and time. On the other hand, if the distance between the newly generated location coordinates and the read location coordinates is shorter than the predetermined distance, the newly generated location coordinates are not stored in the location coordinate storage 62 but discarded. The application executing section 66 executes an application program such as a game program. The application program may be downloaded from another computer via the computer communication network 10 or may be stored in a computer-readable information storage medium such as a CD-ROM or DVD-ROM and installed into the user terminal 16 from it.

The game record storage 68 is to store, as shown in FIG. 22, title IDs, viewing levels, total play times, last play dates and times of a predetermined number (e.g. five) of game programs recently executed by the application executing section 66 in association with each other. The title ID is information to identify an individual game program. The total play time is the total time for which the relevant game program is played thus far. The viewing level is information indicating how much the user is enthusiastic about the relevant game and is calculated from information on the difference between the release date of this game program and the present date, the total play time, and so forth. The last play date and time is the date and time when the relevant game program was played last (start date and time or end date and time).

Various kinds of information showing settings relating to the user are stored in the setting information storage 63. Specifically, in the setting information storage 63, e.g. privacy setting data showing the privacy setting of the user (e.g. value takes a value of "open" or "closed") and up to five privacy area center location data showing the location coordinates (latitude and longitude) of the center point of a privacy area are stored. The user can make settings of the values of the privacy setting data and the privacy area center location data stored in the setting information storage 63 by operating the image for setting of opening and the privacy area setting image displayed on the touch screen 16a.

The location coordinate transmitter 64 transmits, to the user location management server 12, plural pairs of location coordinates and measurement date and time stored in the location coordinate storage 62 and groups of title ID, viewing level, and total play time of a predetermined number of game programs stored in the game record storage 68 by using the mobile phone communication unit 16c or the wireless LAN communication unit 16d. This transmission may be carried out when the user demonstratively orders the transmission by using the touch screen 16a.

Figure 23:
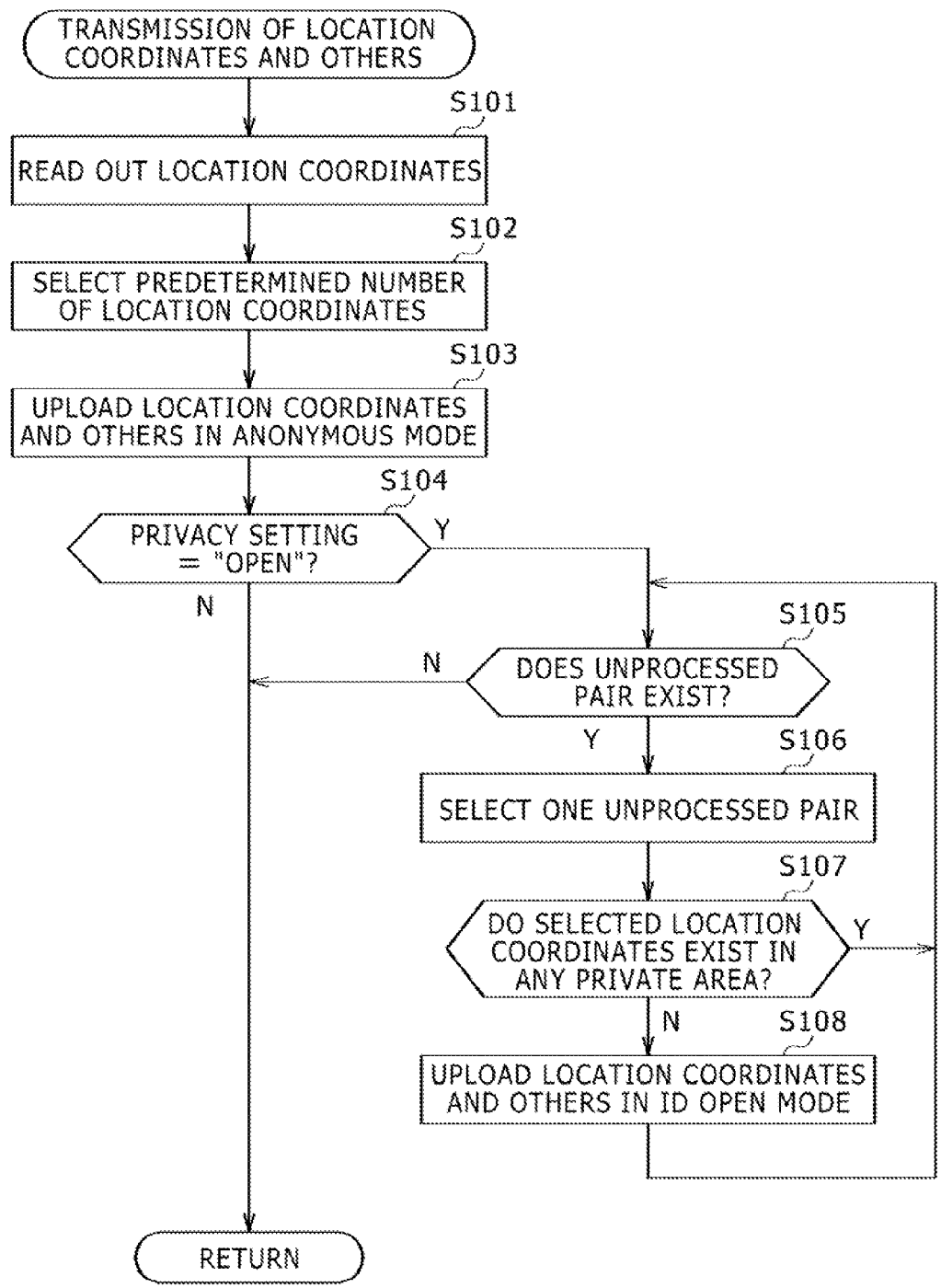
FIG. 23 is a flow diagram for explaining transmission processing of location coordinates and others.

Here, one example of processing of the transmission of the location coordinates and others to the user location management server 12 by the location coordinate transmitter 64 will be described with reference to a flow diagram exemplified in FIG. 23.

First, the location coordinate transmitter 64 reads out the respective location coordinates and measurement dates and times stored in the location coordinate storage 62 (S101). Then, the location coordinate transmitter 64 selects, of these, a predetermined number of pairs of location coordinates and measurement date and time suitable to represent the travel path of the user in the manner already explained (S102). Then, the location coordinate transmitter 64 transmits, to the user location management server 12, the pairs of location coordinates and measurement date and time selected by the processing shown in S102 and groups of title ID, viewing level, and total play time of a predetermined number of game programs stored in the game record storage 68 (S103). The processing shown in S103 will be referred to as upload processing of location coordinates and others in the anonymous mode.

Then, the location coordinate transmitter 64 determines whether or not the privacy setting of the user is "open" (S104). If it is not "open" (i.e. it is "closed") (S104: N), the location coordinate transmitter 64 ends the processing shown in the present processing example. On the other hand, if it is "open" (S104: Y), the location coordinate transmitter 64 checks whether or not a pair for which processing shown in S106 and the subsequent steps in the present processing example has not been executed exists in the pairs of location coordinates and measurement date and time selected by the processing shown in S102 (S105). If the pair exits (S105: Y), the location coordinate transmitter 64 selects one of the pairs of location coordinates and measurement date and time for which the processing shown in the present processing example has not been executed as the pair of location coordinates and measurement date and time treated as the processing target (S106). Then, the location coordinate transmitter 64 checks whether or not the location coordinates selected by the processing shown in S106 exist in any privacy area (S107). Specifically, the location coordinate transmitter 64 checks whether or not location coordinates exist that are set as the values of privacy area center location data and are within a predetermined distance (e.g. 1 km) from the location coordinates selected by the processing shown in S106 (S107). If the location coordinates exist (S107: Y), the location coordinate transmitter 64 proceeds to the processing shown in S105. If the location coordinates do not exist (S107: N), the location coordinate transmitter 64 associates the pair of location coordinates and measurement date and time selected by the processing shown in S106 and the groups of title ID, viewing level, and total play time of a predetermined number of game programs stored in the game record storage 68 with the user ID of the user who uses the user terminal 16 and transmits them to the user location management server 12 (S108), to proceed to the processing shown in S105. The processing shown in S108 will be referred to as upload processing of location coordinates and others in the ID open mode.

If, in the processing shown in S105, it is checked that the pair of location coordinates and measurement date and time for which the processing shown in S106 and the subsequent steps in the present processing example has not been executed does not exist (S105: N), the location coordinate transmitter 64 ends the processing shown in the present processing example.

It is preferable for the location coordinate transmitter 64 to display, on the touch screen 16a, plural pairs of location coordinates and measurement date and time stored in the location coordinate storage 62 and check whether they may be transmitted to the user location management server 12. Moreover, pairs of location coordinates and measurement date and time that are not desired to be transmitted may be deleted and transmission of only the remaining pairs to the user location management server 12 may be allowed. Furthermore, the user may be permitted to make such a setting that this check is omitted. In this case, plural pairs of location coordinates and measurement date and time stored in the location coordinate storage 62 are automatically transmitted periodically (e.g. once a day).

The display controller 70 and the item communication section 72 will be described later.

Figure 24:
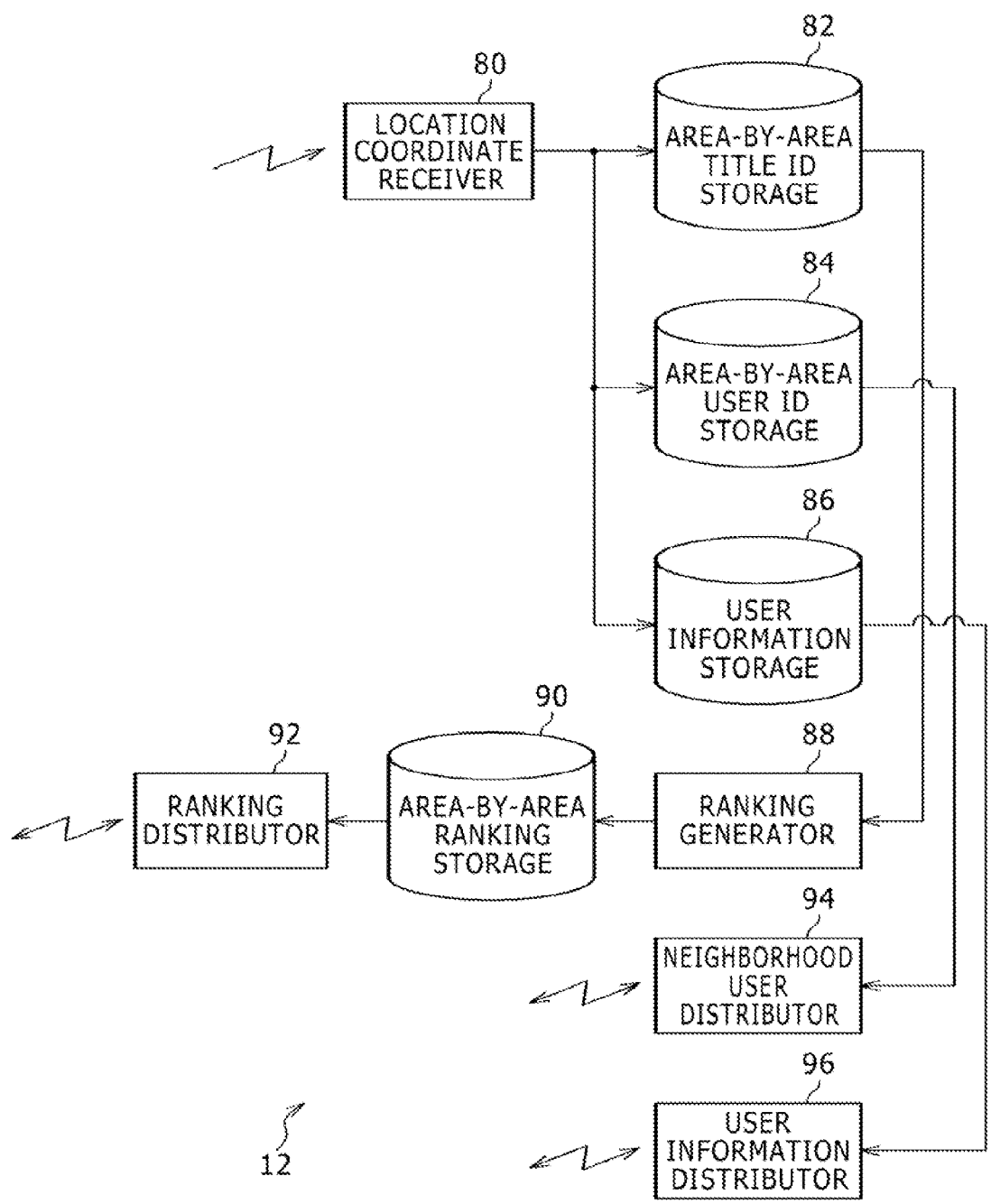
FIG. 24 is a functional block diagram of a user location management server.

Next, FIG. 24 is a functional block diagram of the user location management server 12. As shown in the diagram, the user location management server 12 functionally includes a location coordinate receiver 80, an area-by-area title ID storage 82, an area-by-area user ID storage 84, a user information storage 86, a ranking generator 88, an area-by-area ranking storage 90, a ranking distributor 92, a neighborhood user distributor 94, and a user information distributor 96. These functions are implemented by execution of a program according to the embodiment of the present invention in the user location management server 12 as a computer. This program may be downloaded from another computer via the computer communication network 10 or may be stored in a computer-readable information storage medium such as a CD-ROM or DVD-ROM and installed into the user location management server 12 from it.

The location coordinate receiver 80 receives plural pairs of location coordinates and measurement date and time and a predetermined number of game record data (groups of title ID, viewing level, and total play time of programs), transmitted from the location coordinate transmitter 64 of the user terminal 16.

The area-by-area title ID storage 82 is to store, as shown in FIG. 25, area ID, time slot, and a predetermined number (e.g. 20) of game record data in association with each other. The area ID is information to identify (specify) each mesh area when the area as the management target (e.g. whole area on the earth) is divided into a large number of meshes. The time slot is information to identify a time range of a predetermined time period (e.g. six hours). The game record data includes the title ID, the viewing level, and the total play time. That is, the area-by-area title ID storage 82 stores the predetermined number (e.g. 20) of game record data in association with pairs of area ID and time slot. The location coordinate receiver 80 receives plural pairs of location coordinates and measurement date and time and a predetermined number of game record data from the user terminal 16 by the upload processing of location coordinates and others in the anonymous mode like that shown in the above-described S103 for example. Therefore, the location coordinate receiver 80 derives the area IDs of the areas in which the respective location coordinates received are included. Furthermore, the location coordinate receiver 80 derives the time slots in which the measurement dates and times of the respective location coordinates received are included. Then, the location coordinate receiver 80 stores, in the area-by-area title ID storage 82, the game record data received from the user terminal 16 in association with the pairs of derived area ID and time slot. At this time, if the predetermined number of game record data have been already stored at the relevant place in the area-by-area title ID storage 82, the location coordinate receiver 80 deletes the oldest game record data, and instead, stores the game record data received this time.

The area-by-area user ID storage 84 is to store, as shown in FIG. 26, user ID, location coordinates, and measurement date and time in association with each other on each area ID basis. The location coordinate receiver 80 receives plural pairs of location coordinates and measurement date and time and groups of title ID, viewing level, and total play time of a predetermined number of game programs associated with a user ID from the user terminal 16 by the upload processing of location coordinates and others in the ID open mode like that shown in the above-described S108 for example. Therefore, the location coordinate receiver 80 derives the area IDs of the areas in which the respective location coordinates received are included. Then, the location coordinate receiver 80 stores the user ID of the user who uses the user terminal 16 and the received location coordinates and measurement dates and times in association with the derived area IDs. Furthermore, if a certain time (e.g. one week) has elapsed from the measurement date and time, the location coordinates and the measurement date and time are deleted.

The user information storage 86 is to store, as shown in FIG. 27, user ID, the latest location coordinates, measurement date and time, and a predetermined number (e.g. 20) of game record data in association with each other. The location coordinate receiver 80 receives plural pairs of location coordinates and measurement date and time and a predetermined number of game record data associated with a user ID by the upload processing of location coordinates and others in the ID open mode like that shown in the above-described S108 for example. Therefore, the location coordinate receiver 80 stores, in the user information storage 86, the location coordinates acquired last, the measurement date and time thereof, and the predetermined number of game record data received in association with the user ID of the user who uses the user terminal 16.

The ranking generator 88 is to generate a ranking of game titles on each area ID basis in accordance with the stored contents in the area-by-area title ID storage 82. For example, the ranking generator 88 counts the number of game record data stored in the area-by-area title ID storage 82 for each title ID in association with time slots included in a past certain period (one month or the like) on each area ID basis, and generates the top 10 thereof as the ranking. In the data of this ranking, the total number of game record data (a cumulative number of persons who played the game) of each title ID is included. Alternatively, the ranking generator 88 averages the viewing level of the game record data stored in the area-by-area title ID storage 82 for each title ID in association with time slots included in a past certain period (one month or the like) on each area ID basis, and generates the top 10 of the average value as the ranking. Also in the data of this ranking, the total number of game record data (the cumulative number of persons who played the game) of each title ID is included. The data of the generated ranking is stored in the area-by-area ranking storage 90 in association with the area ID. Furthermore, when receiving location coordinates from the user terminal 16, the ranking distributor 92 derives the area ID of the area in which these location coordinates are included. In addition, the ranking distributor 92 reads out the ranking stored in the area-by-area ranking storage 90 in association with the derived area ID and returns it to the user terminal 16.

When receiving location coordinates and size designation of a search area from the user terminal 16, the neighborhood user distributor 94 employs, as the search area, a group of n×n (1×1, 3×3, 5×5, 7×7, 9×9, ..., 25×25, etc.) areas including (at the center position for example) the area in which the received location coordinates are included. Here, n is decided depending on the size designation of the search area, received from the user terminal 16. Then, the neighborhood user distributor 94 reads out pairs of user ID and location coordinates stored in the area-by-area user ID storage 84 in association with the area IDs of the respective areas configuring the decided search area and returns them to the user terminal 16.

When receiving a user ID from the user terminal 16, the user information distributor 96 returns the latest location coordinates, the measurement date and time, and the predetermined number of game record data stored in the user information storage 86 in association with this user ID. The user terminal 16 may receive these pieces of information from the user information distributor 96 when desiring to display game titles played by a specific user on the touch screen 16a.

Here, display processing of various kinds of screens in the user terminal 16 will be described. As described above, the display controller 70 of the user terminal 16 includes the travel path image generator 70a, the friend image generator 70b, the ranking image generator 70c, the radar image generator 70d, the title profile image generator 70e, the status image generator 70f, and the setting image generator 70g.

Figure 28:
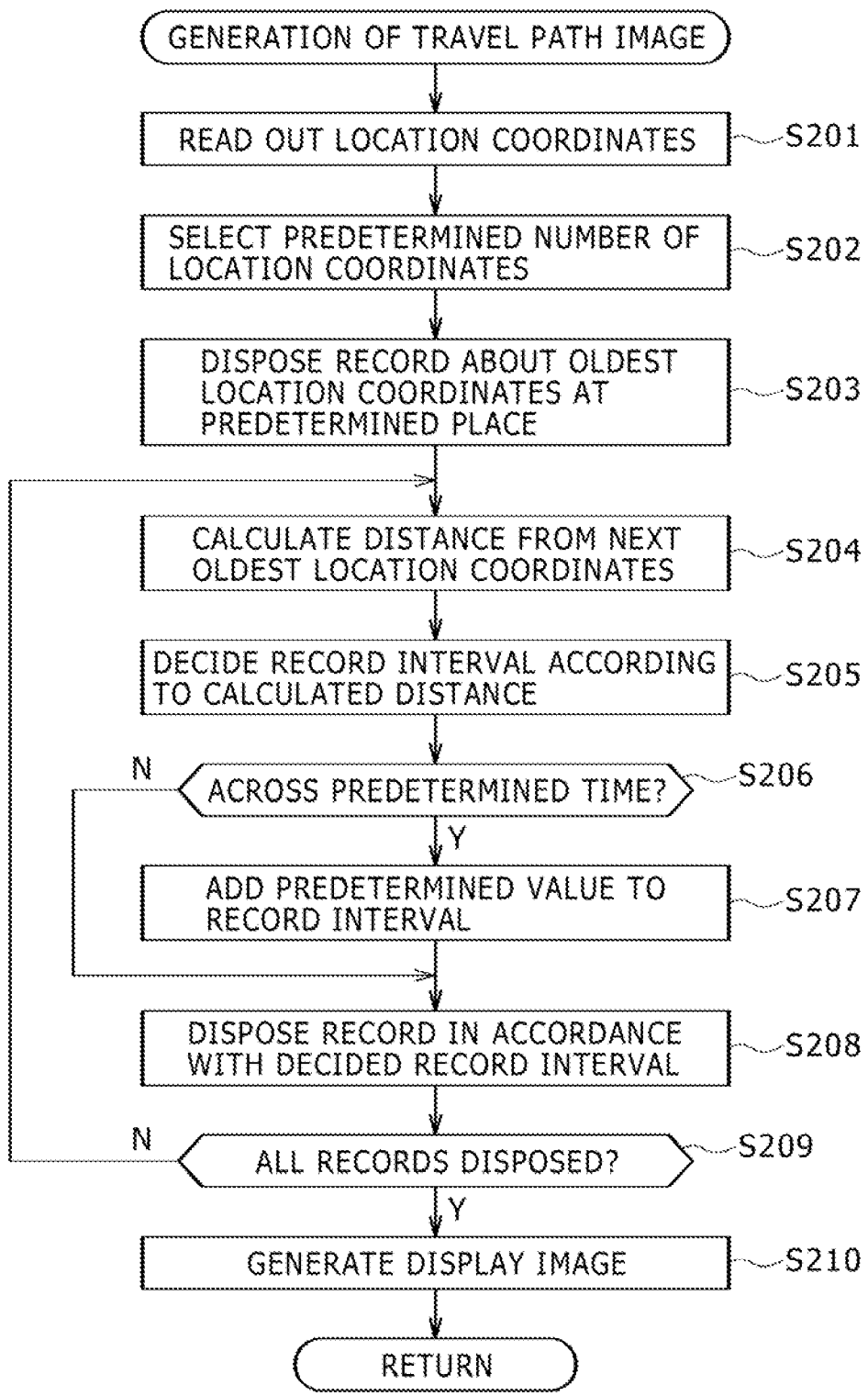
FIG. 28 is a flow diagram showing generation processing of the travel path image.

First, the travel path image generator 70a generates the travel path image shown in FIG. 5. In generation of this image, as shown in FIG. 28, first the travel path image generator 70a reads out the respective location coordinates and measurement dates and times stored in the location coordinate storage 62 (S201). Then, the travel path image generator 70a selects, of these, a predetermined number of pairs of location coordinates and measurement date and time suitable to represent the travel path of the user in the manner already explained (S202).

Next, the travel path image generator 70a disposes the record frame 34 corresponding to the oldest measurement date and time at a predetermined position set at the lower part of the travel path image (S203). Then, the travel path image generator 70a calculates the distance between the location coordinates corresponding to the next oldest measurement date and time and the location coordinates corresponding to the previous measurement date and time (S204). Then, the travel path image generator 70a tentatively decides the interval of the record frames 34 according to the calculated distance (S205). Specifically, if the calculated distance is shorter than a predetermined reference distance, the travel path image generator 70a sets the tentative interval zero. If the calculated distance is equal to or longer than the predetermined reference distance, the travel path image generator 70a employs, as the tentative interval, a value obtained by subtracting the predetermined reference distance from the calculated distance and multiplying the subtraction result by a predetermined coefficient. However, if this tentative interval surpasses the upper-limit interval Wmax, the travel path image generator 70a replaces the tentative interval by Wmax.

Moreover, the travel path image generator 70a determines whether or not the measurement dates and times are across a predetermined time (S206). If they are across the predetermined time, the travel path image generator 70a adds a predetermined percentage of the upper-limit interval Wmax to the above-described tentative interval to update the tentative interval (S207). Also at this time, if the interval after the update surpasses the upper-limit interval Wmax, the travel path image generator 70a replaces the tentative interval by Wmax. The travel path image generator 70a employs the tentative interval updated in this manner as the final interval to decide the display position of the record frame 34. Specifically, the travel path image generator 70a settles the display position of the record frame at the position resulting from movement from the location coordinates corresponding to the previous measurement date and time toward the upper side by the interval calculated by the processing of S204 to S207. At this time, regarding the position in the horizontal direction, the travel path image generator 70a decides it in accordance with the positioning time as shown in FIG. 17. Then, the travel path image generator 70a repeats the processing of S204 to S208 until deciding the display position about all record frames 34, and thereafter generates the image of each record frame 34 in accordance with the decided display positions.

At this time, the travel path image generator 70a acquires address texts corresponding to the respective location coordinates. The address text may be stored in the user terminal 16 in advance in association with the range of the location coordinates or may be stored in the information server 14 similarly. In the latter case, when location coordinates are transmitted to the information server 14, the information server 14 reads out an address text associated with the range in which these location coordinates are included and returns it to the user terminal 16. The address text acquired in this manner is made to be included in the travel path image together with measurement date and time in the order of measurement date and time.

Next, the travel path image generator 70a transmits the respective location coordinates selected in S202 to the user location management server 12 and requests a ranking. In response to this, the ranking distributor 92 of the user location management server 12 derives the area ID of the area in which the received location coordinates are included. In addition, the ranking distributor 92 reads out a ranking stored in the area-by-area ranking storage 90 in association with the derived area ID and returns it to the user terminal 16. If a ranking associated with the same area ID has been already received from the user location management server 12, the travel path image generator 70a compares both rankings. Then, the travel path image generator 70a deems, as titles of note, a game title whose rank order has risen most and a title whose numerical value as a basis of the ranking (the total number of game record data, the average value of the viewing level, etc.) has risen most, and makes the title names thereof be included in the travel path image (numeral 36). Furthermore, if a ranking associated with the same area ID has not yet been received from the user location management server 12, the travel path image generator 70a may deem the first-rank game title in the ranking received this time as a title of note and make its title name be included in the travel path image for example.

Furthermore, the travel path image generator 70a transmits, to the user location management server 12, the respective location coordinates stored in the location coordinate storage 62 and size designation to specify a 1×1 area as the search area and requests a search for neighborhood users. In response to this, the neighborhood user distributor 94 of the user location management server 12 derives the area ID of the area in which the received location coordinates are included. In addition, the neighborhood user distributor 94 reads out all pairs of user ID and location coordinates stored in the area-by-area user ID storage 84 in association with this area ID and returns them to the user terminal 16. The travel path image generator 70a counts the number of user IDs corresponding to each set of location coordinates and displays the situation image 34a according to the number in the record frame 34 relating to the same location coordinates.

Furthermore, the user terminal 16 stores the user IDs of friends of the user of this user terminal 16. If the user ID of the friend stored in this user terminal 16 is included in the user IDs transmitted from the neighborhood user distributor 94 of the user location management server 12, the user terminal 16 represents this by the situation image 34a in the record frame 34 corresponding to this user ID (makes an exclamation mark be included in the situation image 34a for example).

Next, the friend image generator 70b generates the friend image shown in FIG. 10. In the generation of the friend image, the friend image generator 70b reads out the user IDs of friends stored in the user terminal 16 and receives the latest information associated with these user IDs from the information server 14. Examples of the latest information include messages input by the respective users from the user terminal 16 or another computer and a message indicating the execution status of a game program (progression degree of the game, whether the play is good or poor, etc.) automatically generated by the game program executed in the user terminal 16 or another computer. Then, the friend image generator 70b makes them be included in the lower region of the friend image to complete the friend image. The friend image generated in this manner is displayed by the touch screen 16a.

The ranking image generator 70c generates the ranking image shown in FIG. 8. The ranking image generator 70c transmits location coordinates specified by the user to the user location management server 12 and receives data of a ranking from the ranking distributor 92. Then, the ranking image generator 70c generates the ranking image based on the data of the ranking received in this manner. The generated ranking image is displayed by the touch screen 16a. The ranking image generator 70c may receive data of rankings relating to plural location coordinates (e.g. all location coordinates) stored in the location coordinate storage 62. In addition, the ranking image generator 70c may sum up the numerical value of the respective titles as a basis of the generation of the rankings (the total number of game record data, the average value of the viewing level, etc.) for each title and generate a ranking based on the total values to generate and display the ranking image. This can display a comprehensive ranking at plural locations visited by the user (e.g. all locations on the travel path). Of course, the ranking image generator 70c may receive data of a ranking relating to one set of location coordinates among the location coordinates stored in the location coordinate storage 62 and generate and display the ranking image in one area based on the data.

The title profile image generator 70e generates the title profile image shown in FIG. 9. The title profile image generator 70e transmits a title ID to the information server 14 and receives information to be described in the information field. Then, the title profile image generator 70e generates the title profile image based on the information received in this manner. The generated title profile image is displayed by the touch screen 16a.

Furthermore, the status image generator 70f generates the status image shown in FIGS. 11A and 11B.

Here, description will be made about processing when the image in which the text "Players" is shown is tapped by the user in the status image and the status image shown in FIG. 11B is generated. When the image in which the text "Players" is shown is tapped by the user, the status image generator 70f transmits, to the user location management server 12, search reference location coordinates and size designation to specify P×P areas (P is a predetermined number) as the search area about each set of at least one set of location coordinates (hereinafter, referred to as the search reference location coordinates) stored in the location coordinate storage 62 and requests a search for neighborhood users. Then, in response to this, for each set of at least one set of the search reference location coordinates received, the neighborhood user distributor 94 of the user location management server 12 decides, as the search area, a group of P×P areas including (at the center position for example) the area in which the relevant search reference location coordinates are included. Then, about each set of at least one set of the search reference location coordinates received, the neighborhood user distributor 94 reads out pairs of user ID and location coordinates (location coordinates and others uploaded in the ID open mode) stored in the area-by-area user ID storage 84 in association with the area IDs of the respective areas configuring the search area and returns them to the user terminal 16. In addition, the user information distributor 96 returns the latest location coordinates, measurement date and time, and a predetermined number (e.g. five) of game record data stored in the user information storage 86 in association with the user ID returned to the user terminal. Hereinafter, the pair of user ID and location coordinates returned to the user terminal 16 will be referred to as return coordinate data. Furthermore, the return coordinate data is to be associated with the search reference location coordinates. Moreover, hereinafter, the user corresponding to the user ID included in the return coordinate data will be referred to as the user who has "passed" the user who uses the user terminal 16 as the return destination of the return coordinate data.

Then, the status image generator 70f calculates the value of a matching index that is associated with a respective one of the received user IDs and is represented by e.g. any integer from zero to five inclusive based on the data returned from the user location management server 12. Here, for example, the number calculated as the value of the matching index associated with the user ID is e.g. the number of title IDs corresponding with any of the title IDs of a predetermined number (e.g. five) of games recently played by the user who uses the user terminal 16 as the return destination of the game record data in the title IDs of the predetermined number (e.g. five) of games recently played by the user corresponding to this user ID, indicated by the game record data returned from the user location management server 12.

Furthermore, the status image generator 70f calculates the value of the number of times of passing associated with a respective one of the received user IDs. Here, for example, the number calculated as the value of the number of times of passing associated with the user ID is e.g. the number of return coordinate data in which this user ID is included. The number of times of passing associated with the user ID corresponds to e.g. the number of times of upload of the pair of this user ID and location coordinates in the above-described search area in the ID open mode within the nearest one week. Thus, the number of times of passing associated with the user ID will substantially represent the number of times (frequency) of passing of the user corresponding to this user ID with the user who uses the user terminal 16 as the return destination of the return coordinate data (the number of times (frequency) of the presence in vicinity).

About each of the received user IDs, the status image generator 70*f* generates the user corresponding information showing the identification information of the user associated with the relevant user ID (e.g. user ID and avatar image of the user), the value of the matching index calculated in the above-described manner, and the number of times of passing. Then, in the present embodiment, the status image generator 70*f* disposes the user corresponding information associated with a respective one of the received user IDs on the lower side of the status image in order decided based on a predefined rule. For example, in the example of FIG. 11B, the status image generator 70*f* disposes the user corresponding information of the users whose decided order is from the first to the third on the uppermost row in order from the left to the right. Then, the status image generator 70*f* disposes the user corresponding information of the users whose decided order is from the fourth to the sixth on the second uppermost row in order from the left to the right, and disposes the user corresponding information of the users whose decided order is from the seventh to the ninth on the third uppermost row in order from the left to the right. Also for the subsequent users, the user corresponding information is disposed in the decided order similarly. Furthermore, in the example of FIG. 11B, the value of the number of times of passing is expressed by a number and the value of the matching index is expressed by the number of images representing the matching index. In FIG. 11B, the value of the matching index of James is five and the value of the matching index of Stephan and Anna is four. In addition, the values of the number of times of passing of James, Stephan, and Anna are eight, seven, and six, respectively. Moreover, in the present embodiment, the user carries out slide operation from the lower side to the upper side to the touch screen 16*a* and thereby the status image is scrolled in the upward direction, so that the user corresponding information of users whose decided order described above is low is displayed.

Furthermore, in the present embodiment, specifically the status image generator 70*f* disposes the user corresponding information corresponding to the user IDs included in the relevant return coordinate data in the above-described manner in reverse chronological order of the timing when the search reference location coordinates associated with the received return coordinate data are measured in the user terminal 16 (in the present embodiment, e.g. measurement date and time) for example. The order of placement of the user corresponding information is not limited to the above-described reverse chronological order of the measurement date and time. For example, the status image generator 70*f* may dispose the user corresponding information in the above-described manner in decreasing order of the value of the number of times of passing calculated in the above-described manner. Furthermore, the status image generator 70*f* may dispose the user corresponding information in the above-described manner in decreasing order of the value of the matching index for example.

In the present embodiment, if the privacy setting of the user is "closed," the user corresponding information is not disposed in the status image of the user terminal 16 of this user. Instead, a message, "Setting your online ID open allows you to find other players." or the like, is disposed. Furthermore, the user corresponding information corresponding to a user registered as a friend in the user terminal 16 may be disposed in the status image even when the number of times of passing is zero.

In addition, in the present embodiment, the user corresponding information disposed on the lower side of the status image can be tapped by the user. Furthermore, when the user corresponding information is tapped by the user, the user terminal 16 displays, on the touch screen 16*a*, an image generated based on information on the latest location coordinates, measurement date and time, game record data, and so forth associated with the user ID corresponding to this user corresponding information. In the present embodiment, specifically, an image including e.g. the following data is displayed on the touch screen 16*a*: the user ID, the matching index, the number of times of passing, the titles of a predetermined number (e.g. five) of games recently played by the user corresponding to this user ID, address text corresponding to the search reference location coordinates measured in the user terminal 16 when the user corresponding to this user ID passed the user who uses the user terminal 16 last, the measurement date and time in the user terminal 16 about this search reference location coordinates, and so forth. Furthermore, if the user corresponding to the tapped user corresponding information (corresponding user) is not registered in the user terminal 16 as a friend of the user who uses the user terminal 16, a button for friend application may be allowed to be included in the image displayed on the touch screen 16*a*. Furthermore, when this button is tapped by the user, the user terminal 16 may register the corresponding user as a friend of the user who uses the user terminal 16 (stores the user ID of the corresponding user as the user ID of a friend).

Moreover, for example, if information showing attributes of users, such as owned pieces of video content associated with the age and sex of the user and genres and owned pieces of music content associated with genres, is stored in the user location management server 12, the user information distributor 96 may return, to the user terminal 16, the information showing attributes of users in association with the user IDs returned to the user terminal 16. Furthermore, the status image generator 70*f* may calculate the value of the matching index in such a manner that the value of the matching index is larger when the commonality is higher between the attributes of the user shown by the information returned from the user location management server 12 and the attributes of the user who uses the user terminal 16 as the return destination. For example, the matching indexes associated with the respective user IDs may be so calculated that the value of the matching index is larger for a user whose sex corresponds with that of the user who uses the user terminal 16 than for a user who is not so and the value of the matching index is larger for a user having a smaller age difference from the user who uses the user terminal 16 and the value of the matching index is larger for a user corresponding with the user who uses the user terminal 16 in the genre in which the number of owned pieces of video content (or owned pieces of music content) is the largest than for a user who is not so. Of course, in the calculation of the matching index, besides the above-described factors, e.g. the commonality of games recently played, the value of the number of times of passing, the newness of the measurement date and time of the search reference location coordinates, and so forth may be added.

An upper limit (e.g. 100) may be set on the number of pieces of user corresponding information disposed in the status image. Furthermore, in the user terminal 16, an upper limit (e.g. 200) may be set on the number of users corresponding to data stored for control of displaying of the user corresponding information (e.g. user ID, location coordinates, game record data, data showing attributes of a user, etc.). Furthermore, when the return coordinate data and others are returned from the user location management server 12 to the user terminal 16 about users exceeding this upper limit, the user terminal 16 identifies the returned coordinate data corresponding to the search reference location coordinates associated with the oldest measurement date and time. Then, the user terminal 16 may delete, from the user terminal 16, the data that corresponds to the user ID corresponding to the identified return coordinate data and is stored for control of displaying of the user corresponding information. Moreover, at this time, the user terminal 16 may delete, from the user terminal 16, the data that corresponds to the user ID corresponding to the return coordinate data in which the oldest measurement date and time is included, identified from the return coordinate data corresponding to user IDs about which the value of the number of times of passing is equal to or smaller than a predetermined value, and is stored for control of displaying of the user corresponding information.

Furthermore, after the previous request for a search for neighborhood users, the user terminal 16 may request a search for neighborhood users in which each set of at least one set of location coordinates newly stored in the location coordinate storage 62 is employed as the search reference location coordinates at predetermined timing (e.g. at a predetermined time interval). Then, in response to this, for each set of at least one set of the search reference location coordinates received, the neighborhood user distributor 94 of the user location management server 12 may decide, as the search area, a group of P×P areas including (at the center position for example) the area in which the relevant search reference location coordinates are included. Then, the neighborhood user distributor 94 may read out user IDs and so forth stored in the area-by-area user ID storage 84 in association with the area IDs of the respective areas configuring the search area and return them to the user terminal 16. In addition, the user information distributor 96 may return the latest location coordinates, measurement date and time, and a predetermined number (e.g. five) of game record data stored in the user information storage 86 in association with the user ID returned to the user terminal. Then, the user terminal 16 may add the returned data to the data stored for control of displaying of the user corresponding information. If this is employed, the data stored in the user terminal 16 for control of displaying of the user corresponding information is sequentially updated. Here, some data may be deleted in the above-described manner when the return coordinate data and others are returned from the user location management server 12 to the user terminal 16 about users exceeding the upper limit of the number of users corresponding to the data stored for control of displaying of the user corresponding information.

As described above, according to the present embodiment, for example, the user corresponding information corresponding to the user ID included in the received return coordinate data is disposed on the upper side when the measurement date and time included in this return coordinate data is newer, or the user corresponding information with a larger value of the number of times of passing or a larger value of the matching index is disposed on the upper side. Therefore, the user of the user terminal 16 can easily find a user expected to have a high relevance with the user who uses the user terminal 16 (user as a friend candidate), such as a user corresponding to the return coordinate data in which included measurement date and time is new or a user with a large value of the number of times of passing or the matching index.

Furthermore, the setting image generator 70g generates the setting image shown in FIG. 12, the image for setting of opening shown in FIG. 13, and the privacy area setting image shown in FIG. 14.

In generation of the privacy area setting image, first the setting image generator 70g acquires a map with a predetermined size centered at the present location of the user from the information server 14. Then, the setting image generator 70g selects a predetermined number of pairs from pairs of location coordinates and measurement date and time that have not been transmitted by the location coordinate transmitter 64 and are stored in the location coordinate storage 62 in the manner already explained. Then, about the selected location coordinates, the setting image generator 70g disposes an avatar image 116 of the user who uses the user terminal 16 at the position on the map corresponding to these location coordinates. In addition, the setting image generator 70g disposes a text representing the measurement date and time associated with these location coordinates in the vicinity thereof. Moreover, about the location coordinates that are not selected, the setting image generator 70g disposes a small image 120 of a cross mark at the position on the map corresponding to these location coordinates. Furthermore, the setting image generator 70g disposes, on the map, also a curve (represented by a dotted line in the example of FIG. 14) made by sequentially linking the positions on the map corresponding to the location coordinates that have not been transmitted by the location coordinate transmitter 64 and are stored in the location coordinate storage 62 from the earliest measurement date and time associated with the location coordinates. The privacy area setting image generated in this manner is displayed on the touch screen 16a. In this manner, the user can come to know which location coordinates and others are transmitted in the next transmission of the location coordinates and others to the user location management server 12. Furthermore, the setting image generator 70g disposes a circular area 122 representing the range of a privacy area at the center of the touch screen 16a.

Moreover, in the privacy area setting image, the user carries out slide operation to a circular image 122 and thereby can change the position of the circular image 122 in the slide direction. Furthermore, by tapping the circular image 122, if the area in the circular image 122 is not set as a privacy area, this area is set as a privacy area (i.e. the location coordinates of the center location of this area are stored as privacy area center location data). If the area in the circular image 122 is set as a privacy area, this setting is deactivated (i.e. privacy area center location data that corresponds to this area and is stored in the setting information storage 63 is deleted).

In addition, when a privacy area is set, the setting image generator 70g determines whether or not the distance from the center location of the privacy area is within a predetermined range (e.g. within 1 km) about the above-described respective location coordinates selected. For the location within the predetermined range, the setting image generator 70g changes the avatar image 116 of the user who uses the user terminal 16 to an avatar image 118 representing an anonymous user in the privacy area setting image. Furthermore, when setting of a privacy area is deactivated, the setting image generator 70g determines whether or not the distance from the center location of the deactivated privacy area is within a predetermined range (e.g. within 1 km) about the above-described respective location coordinates selected. For the location within the predetermined range, the setting image generator 70g changes the avatar image 118 representing an anonymous user to the avatar image 116 of the user who uses the user terminal 16 in the privacy area setting image. In FIG. 14, the privacy area setting image in which the area in the circular image 122 is set as a privacy area is shown. Therefore, the avatar images in the area occupied by the circular image 122 are the avatar images 118 representing an anonymous user and the avatar image outside the area occupied by the circular image 122 is the avatar image 116 representing the user of the user terminal 16.

In this manner, the user can come to know location coordinates for which the upload processing of location coordinates and others in the ID open mode is not executed even when location coordinates for which the upload processing of location coordinates and others in the ID open mode is executed and the privacy setting are "open."

The radar image generator 70d generates the radar image shown in FIG. 7. In generation of the radar image, first the radar image generator 70d transmits, to the user location management server 12, location coordinates specified by the user among location coordinates stored in the location coordinate storage 62 and size designation to specify a 1×1 area as the search area and requests a search for neighborhood users. Then, the radar image generator 70d receives user IDs and location coordinates returned in response to this from the neighborhood user distributor 94 of the user location management server 12. If the number of received user IDs is smaller than 10, next the radar image generator 70d transmits, to the user location management server, the same location coordinates together with size designation to specify 2×2 areas as the search area and requests a search for neighborhood users again. Furthermore, the radar image generator 70d makes a search for neighborhood users be repeatedly carried out until the numbers of received user IDs and sets of location coordinates become equal to or larger than 10 or the search area becomes M×M areas (M is a predetermined number). The radar image generator 70d generates the radar image based on the user IDs and the location coordinates received from the neighborhood user distributor 94 in this manner. Specifically, the radar image generator 70d calculates the differences between the location coordinates specified by the user and the respective location coordinates received from the neighborhood user distributor 94 and decides the display position of each avatar image 48 indicating another user. That is, the radar image generator 70d makes the respective avatar images 48 be displayed in accordance with the relative positions of other user terminals 16 with respect to the user terminal 16 of oneself. In this manner, in the present embodiment, the distance between the location coordinates of oneself and the location coordinates of a neighborhood user whose privacy setting is open is represented substantially as the distance from the center point of the radar image to the avatar image 48. Moreover, the radar image generator 70d obtains the total sum of the cumulative numbers of persons who played a game (sum of the cumulative numbers of persons who played a game about overall titles) received from the ranking distributor 92 in generation of the travel path image and randomly disposes the small images 52 depending on the obtained number in the radar image. In the present embodiment, the number of small images 52 increases as the total sum of the cumulative numbers of persons who played a game increases. The radar image generated in this manner is also displayed by the touch screen 16a. In this manner, in the present embodiment, how many users are playing games in the vicinity of oneself is substantially represented in the radar image.

When the user taps the avatar image 48 in the radar image, the user terminal 16 transmits, to the user location management server 12, a user information distribution request associated with the user ID corresponding to this avatar image 48. Then, the user information distributor 96 of the user location management server 12 returns the latest location coordinates, measurement date and time, and the predetermined number of game record data stored in the user information storage 86 in association with the user ID associated with the accepted request. Then, the user terminal 16 displays an image generated based on this information on the touch screen 16a.

As described above, in the present embodiment, the user location management server 12 controls whether or not to provide information relating to the user terminal 16 as the provision source of the information to the user terminal 16 as the provision destination of the information according to location coordinates that are acquired from the user terminal 16 as the provision source of the information and are stored in the area-by-area user ID storage 84 and location coordinates that are acquired from the user terminal 16 as the provision destination of the information and are specified by the user of the user terminal 16 as the provision destination of the information. Furthermore, in the present embodiment, the information stored in the area-by-area user ID storage 84 is based on location coordinates and others transmitted from the user terminal 16 to the user location management server 12 by the upload processing of location coordinates and others in the ID open mode. Moreover, in the present embodiment, location coordinates in a privacy area are not transmitted to the user location management server 12 by the upload processing of location coordinates and others in the ID open mode. Therefore, location coordinates outside privacy areas are used for the control by the user location management server 12 as to whether or not to provide information relating to the user terminal 16 as the provision source of the information to the user terminal 16 as the provision destination of the information.

Furthermore, as described above, in the present embodiment, location coordinates transmitted in the ID open mode from the user terminal 16 are used for control as to whether or not to provide information relating to the user of the user terminal 16 as the upload source to other user terminals 16. On the other hand, location coordinates transmitted in the anonymous mode from the user terminal 16 are used for generation of a ranking by the ranking generator 88 but are not used for the control as to whether or not to provide information relating to the user of the user terminal 16 as the upload source to other user terminals 16.

The item communication section 72 is to exchange data of an item used in a game program and so forth. When causing the appearance of an item in execution of a game program, the application executing section 66 stores the identification information (item ID) of this item in the game record storage 68. When the item ID is stored in the game record storage 68 in this manner, the item communication section 72 transmits this item ID to the user location management server 12 together with the respective location coordinates stored in the location coordinate storage 62. Then, in the user location management server 12, the pair of item ID and user ID is stored in association with the area IDs of the areas in which the respective location coordinates are included. In the above-described manner, upload of the item ID is completed.

The item communication section 72 also executes processing of receiving item IDs uploaded by other users. In this case, the item communication section 72 transmits the respective location coordinates stored in the location coordinate storage 62 to the user location management server 12. The user location management server 12 returns pairs of item ID and user ID stored in association with the area IDs of the areas in which the respective location coordinates received are included. The item communication section 72 may make the game record storage 68 store all item IDs received in this manner to allow items identified by these item IDs to be used in game programs. Alternatively, the item communication section 72 may calculate the degree of compatibility based on its own user ID and a user ID received together with an item ID. Then, only when this degree of compatibility is equal to or higher than a certain value, the item communication section 72 may make the game record storage 68 store the item ID to allow an item identified by this item ID to be used in a game program.

Furthermore, the display controller 70 displays a tab image in the tab region 42 of the touch screen 16a as described above and executes image switching processing when this tab image is tapped or when an image of a button or the like disposed in an image displayed in the main region 44 is tapped. FIG. 29 is a flow diagram showing this image switching processing. As shown in the diagram, first the display controller 70 determines whether a tab image is tapped (S301) and whether an image of a button or the like in the main region 44 is tapped (S302). If an image in the main region 44 is tapped, the display controller 70 generates an image made by linking a tab image with an image associated with this image (S303). The tab image is linked with the left end of the image specified by the user and the link position in the vertical direction is decided in accordance with a display image management table shown in FIG. 30. Specifically, the display image management table is a table to record which image is displayed in what order, and which order the image to be presently displayed is in can be determined from this table. If the image is the n-th image, a tab image is linked with the image displayed in the main region 44 in such a manner that the upper end of the tab image is located at the position resulting from multiplication of the vertical length of the tab image by (n−1). Thereafter, the display controller 70 makes the image generated in this manner appear from the right end of the touch screen 16a (S304). Moreover, the display image table shown in FIG. 27 is updated.

On the other hand, if a tab image is tapped (S301), the tab image displayed in the tab region 42 subsequent to the tapped tab image and the image relating to it are erased (S306). Specifically, the tab image displayed in the tab region 42 subsequent to the tapped tab image and the image relating to it are determined from the display management table. Then, images are slid in the right direction sequentially from the tab image whose order is later in the display management table and the image relating to it. In this manner, these images are erased from the touch screen 16a. Thereafter, the record corresponding to the erased tab image is deleted from the display management table.

According to the communication system described above, it becomes possible to realize the existence of other users present in the same living area without using short-distance wireless communication. Furthermore, the trajectory of locations measured by the positioning unit 16b can be so displayed as to be easy to understand for the user without displaying a map on the touch screen 16a.

The present invention is not limited to the above-described embodiment and various kinds of modified implementation are possible. For example, in the upload processing of location coordinates and others in the ID open mode, if location coordinates as the subject of transmission exist in any privacy area, the location coordinate transmitter 64 may transmit them to the user location management server 12 in association with a non-open flag. Furthermore, the location coordinate receiver 80 may store these location coordinates and others in the area-by-area user ID storage 84 in association with the non-open flag. In addition, the neighborhood user distributor 94 may be allowed not to return the pair of user ID and location coordinates associated with the non-open flag to the user terminal 16. Moreover, in this case, the ranking generator 88 may generate a ranking of game titles also based on location coordinates and others transmitted from the user terminal 16 to the user location management server 12 by the upload processing of location coordinates and others in the ID open mode (including also location coordinates and others associated with the non-open flag) in addition to location coordinates and others transmitted in the anonymous mode from the user terminal 16 to the user location management server 12. This makes it possible to generate a more detailed ranking than when a ranking is generated from only location coordinates and others transmitted in the anonymous mode from the user terminal 16 to the user location management server 12.

Furthermore, for example, the size and shape of the privacy area may be settable by the user. In addition, data representing the range of a privacy area is not limited to the privacy area center location data. For example, in the setting information storage 63, information representing the size and shape of a privacy area may be stored in association with the privacy area center location data.

Furthermore, for example, in the above description, in the area-by-area user ID storage 84, the user IDs of users who have measured location coordinates in areas identified by the respective area IDs within a predetermined time (e.g. one week) and have uploaded them to the user location management server 12 are accumulated. In addition, when the user terminal 16 transmits location coordinates to the user location management server 12, the neighborhood user distributor 94 identifies the area ID corresponding to these location coordinates and returns pairs of user IDs and location coordinates stored in the area-by-area user ID storage 84 in association with this area ID. Then, the user terminal 16 generates a radar image based on this information and displays messages in a travel path image. That is, according to the above-described example, information relating to the user terminals 16 that have measured locations in the same area within the predetermined time (e.g. one week) is provided from the user location management server 12.

On the other hand, according to a modification example, the neighborhood user distributor 94 returns also measurement dates and times in addition to user IDs and location coordinates stored in association with the identified area ID. That is, it returns groups of user ID, location coordinates, and measurement date and time. The user terminal 16 reads out the measurement date and time of each set of location coordinates from the location coordinate storage 62 and selects groups in which the difference of the measurement date and time is within a predetermined time to display information relating to the groups. For example, the user terminal 16 receives information (e.g. latest information and so forth) on the user identified by the user ID of the group from the information server 14 and displays it, or displays the avatar image 48 corresponding to the user ID of the group in a radar image. Alternatively, if the user ID of the group is the user ID of a friend stored in advance, a message, "A footprint of a friend is found" or the like, may be displayed. This can display, on the touch screen 16a, information relating to the user terminals 16 that have carried out positioning in the same area with a difference within the predetermined time. Furthermore, the user terminal 16 may calculate the difference of measurement date and time and the difference of location coordinates and select groups in which the difference of measurement date and time is within a predetermined time and the difference of location coordinates is within a predetermined distance to display information relating to the groups. This can display information relating to the user terminals 16 estimated to have been close in terms of both time and place on the touch screen 16a.

In addition, according to another modification example, when the user terminal 16 transmits location coordinates to the user location management server 12, the neighborhood user distributor 94 identifies the area ID corresponding to these location coordinates and reads out pairs of user ID and location coordinates stored in the area-by-area user ID storage 84 in association with this area ID. Then, the neighborhood user distributor 94 selects pairs in which the difference between the location coordinates transmitted from the user terminal 16 and the read location coordinates is within a predetermined distance. Then, it returns the selected pairs to the user terminal 16. The user terminal 16 generates a radar image based on this information and displays messages in a travel path image. This can display, on the touch screen 16*a*, only information relating to the user terminals 16 that have carried out positioning within the predetermined distance.

According to further another modification example, the user terminal 16 transmits location coordinates and the measurement date and time thereof to the user location management server 12. The neighborhood user distributor 94 identifies the area ID corresponding to the received location coordinates and reads out groups of user ID, location coordinates, and measurement date and time stored in the area-by-area user ID storage 84 in association with this area ID. Then, the neighborhood user distributor 94 selects groups in which the difference between the measurement date and time transmitted from the user terminal 16 and the read measurement date and time is within a predetermined time. Then, it returns the selected groups to the user terminal 16. Alternatively, the neighborhood user distributor 94 selects groups in which the difference of measurement date and time is within a predetermined time and the difference of location coordinates is within a predetermined distance and returns the selected groups to the user terminal 16. The user terminal 16 generates a radar image based on the returned information and displays messages in a travel path image. This also can display information relating to the user terminals 16 estimated to have been close in terms of both time and place on the touch screen 16*a*.

According to further another modification example, for each pair of area ID and time slot, the area-by-area user ID storage 84 stores user IDs, location coordinates, and measurement dates and times relating to the user terminals 16 that have measured a location in the area identified by this area ID at date and time in this time slot. Then, the user terminal 16 transmits location coordinates and the measurement date and time thereof to the user location management server 12. The neighborhood user distributor 94 identifies the area ID corresponding to the received location coordinates and identifies the time slot corresponding to the received measurement date and time. Then, it returns groups of user ID, location coordinates, and measurement date and time stored in the area-by-area user ID storage 84 in association with the identified area ID and the identified time slot. Then, the user terminal 16 generates a radar image based on these pieces of information and displays messages in a travel path image. This also can display information relating to the user terminals 16 estimated to have been close in terms of both time and place on the touch screen 16*a*.

The invention claimed is:

1. An information processing system characterized by including
    a location information acquiring unit operating to acquire, from each of a plurality of information processing terminals, location information showing a location measured in the information processing terminal, and
    a display control unit operating to carry out control to make identification information of a plurality of users be displayed on a specific terminal that is the information processing terminal as a provision destination of information,
    wherein the display control unit carries out control to make the identification information of the plurality of users be displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

2. The information processing system according to claim 1, characterized in that the display control unit carries out control to make the identification information of the plurality of users be displayed in order according to a degree of commonality between attributes of the user as the subject of the display control and attributes of a user corresponding to the specific terminal.

3. The information processing system according to claim 2, characterized in that the display control unit carries out control to make the identification information of the plurality of users be displayed in order according to a degree of commonality between games played by the user as the subject of the display control and games played by the user corresponding to the specific terminal.

4. An information processing terminal characterized by including:
    a receiver operating to accept information from a server that acquires, from each of a plurality of information processing terminals, location information showing a location measured in the information processing terminal, and
    a display control operating to carry out control to make identification information of a plurality of users be displayed based on the accepted information,
    wherein the display control carries out control to make the identification information of the plurality of users be displayed in order according to timing when a reference location that is a location measured by the information processing terminal of oneself is measured by the information processing terminal of oneself or the number of times of existence of a location shown by location information acquired from the information processing terminal corresponding to a user as a subject of display control in an area including the reference location that is the location measured by the information processing terminal of oneself about a case in which the location shown by the location information acquired from the information processing terminal corresponding to the user as the subject of the display control exists in the area including the reference location.

5. An information processing method, comprising the steps of:
    of acquiring, from each of a plurality of information processing terminals, location information showing a location measured in the information processing terminal, and carrying out control to make identification information of a plurality of users be displayed on a specific terminal that is the information processing terminal as a provision destination of information, wherein in the step of carrying out control, the control is so carried out that the identification information of the plurality of users is displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

6. A non-transitory, computer readable storage medium containing a program, which when executed by a computer, causes the computer to implement the following:

a location information acquiring unit operating to acquire, from each of a plurality of information processing terminals, location information showing a location measured in the information processing terminal, and a display control unit operating to carry out control to make identification information of a plurality of users be displayed on a specific terminal that is the information processing terminal as a provision destination of information, wherein the display control unit carries out control to make the identification information of the plurality of users be displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

7. A computer having a microprocessor and a non-transitory computer-readable information storage medium in which a program is stored, where the microprocessor executes the program, which causes the computer to function as:

a location information acquiring unit operating to acquire, from each of a plurality of information processing terminals, location information showing a location measured in the information processing terminal, and a display control unit operating to carry out control to make identification information of a plurality of users be displayed on a specific terminal that is the information processing terminal as a provision destination of information, wherein the display control unit carries out control to make the identification information of the plurality of users be displayed in order according to timing when a reference location that is a location shown by location information acquired from the specific terminal is measured by the specific terminal or the number of times of existence of a location shown by location information acquired from the information processing terminal corresponding to a user as a subject of display control in an area including the reference location that is the location shown by the location information acquired from the specific terminal about a case in which the location shown by the location information acquired from the information processing terminal corresponding to the user as the subject of the display control exists in the area including the reference location.

* * * * *